(12) United States Patent
Arakawa et al.

(10) Patent No.: US 8,943,484 B2
(45) Date of Patent: Jan. 27, 2015

(54) CODE GENERATION METHOD AND INFORMATION PROCESSING APPARATUS

(71) Applicant: Fujitsu Limited, Kawasaki-shi (JP)

(72) Inventors: Takashi Arakawa, Numazu (JP); Shuichi Chiba, Numazu (JP); Toshihiro Konda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 67 days.

(21) Appl. No.: 13/794,938

(22) Filed: Mar. 12, 2013

(65) Prior Publication Data
US 2013/0262835 A1    Oct. 3, 2013

(30) Foreign Application Priority Data
Mar. 29, 2012  (JP) .................................. 2012-076510

(51) Int. Cl.
*G06F 9/45*      (2006.01)
*G06F 9/38*      (2006.01)

(52) U.S. Cl.
CPC .............. *G06F 9/3887* (2013.01); *G06F 8/445* (2013.01)
USPC ......................................... 717/144; 147/148

(58) Field of Classification Search
None
See application file for complete search history.

(56) References Cited

U.S. PATENT DOCUMENTS 7,802,076 B2    9/2010  Almog et al.
8,225,285 B2 *  7/2012  Godwin et al. ............... 717/124

FOREIGN PATENT DOCUMENTS

JP    2003-202991     7/2003
JP    2011-165216     8/2011
WO    WO-2006/007193  1/2006

* cited by examiner

*Primary Examiner* — Chuck Kendall
(74) *Attorney, Agent, or Firm* — Fujitsu Patent Center

(57) ABSTRACT

An information processing apparatus generates first and second operation trees representing a dependency relationship among the instructions included in a first code, and computes first and second operation sequences from the first and second operation trees. Then, the information processing apparatus computes the longest ones of operation subsequences common to the first and second operation sequences, evaluates, for each longest operation subsequence, the utilization of computing resources used for executing the combinations of instructions of the first and second operation trees corresponding to the operations included in the longest operation subsequence, and selects a combination pattern of instructions indicated by any one of the longest operation subsequences on the basis of the evaluation results.

7 Claims, 28 Drawing Sheets

| ID | PATTERN | OPERATION TREE 1 | OPERATION TREE 2 |
|---|---|---|---|
| 1 | ++++ | 3, 1, 2, 5 | 8, 6, 9, 10 |
| 2 | ++×+ | 3, 1, 4, 5 | 8, 6, 7, 9 |
| 3 | ++×+ | 3, 1, 4, 5 | 8, 6, 7, 10 |
| 4 | ++×+ | 1, 2, 4, 5 | 8, 6, 7, 9 |
| 5 | ++×+ | 1, 2, 4, 5 | 8, 6, 7, 10 |
| 6 | ++×+ | 3, 2, 4, 5 | 8, 6, 7, 9 |
| 7 | ++×+ | 3, 2, 4, 5 | 8, 6, 7, 10 |

| s1 | V(I) | V(I+1) | = | s2 | E(I) | E(I+1) | + | s3 | F(I) | F(I+1) |

| s4 | T(I) | T(I+1) | = | s5 | A(I) | A(I+1) | + | s6 | B(I) | B(I+1) |

| s7 | — | U(I+1) | = | s8 | — | C(I+1) | × | s9 | — | D(I+1) |

| s10 | C(I) | T(I+1) | ← | s4 | T(I) | T(I+1) | (TRANSFER BETWEEN REGISTERS)

| s11 | U(I) | W(I+1) | = | s10 | C(I) | T(I+1) | + | s7 | D(I) | U(I+1) |

| s11 | W(I) | W(I+1) | = | s4 | T(I) | — | × | s11 | U(I) | W(I+1) |

| s12 | X(I) | X(I+1) | = | s1 | V(I) | V(I+1) | + | s11 | W(I) | W(I+1) |

FIG. 12

| s1 | V(I) | V(I+1) | = | s2 | E(I) | E(I+1) | + | s3 | F(I) | F(I+1) |

| S4 | T(I) | T(I+1) | = | s5 | A(I) | A(I+1) | + | s6 | B(I) | B(I+1) |

| s7 | — | U(I+1) | = | s8 | — | C(I+1) | × | s9 | — | D(I+1) |

| s11 | U(I) | — | = | s10 | C(I) | — | + | s7 | D(I) | U(I+1) |

| s11 | U(I) | W(I+1) | = | s4 | T(I) | T(I+1) | + | s7 | D(I) | U(I+1) |

| s11 | W(I) | W(I+1) | = | s4 | T(I) | T(I+1) | × | s11 | U(I) | W(I+1) |

| s12 | X(I) | X(I+1) | = | s1 | V(I) | V(I+1) | + | s11 | W(I) | W(I+1) |

FIG. 13

| s1 | V(I) | V(I+1) | = | s2 | E(I) | E(I+1) | + | s3 | F(I) | F(I+1) |

| s4 | T(I) | T(I+1) | = | s5 | A(I) | A(I+1) | + | s6 | B(I) | B(I+1) |

| s7 | U(I) | — | = | s8 | C(I) | — | + | s9 | D(I) | — |

| s10 | T(I) | C(I+1) | ← | s4 | T(I) | T(I+1) |  (TRANSFER BETWEEN REGISTERS)

| s11 | W(I) | U(I+1) | = | s10 | T(I) | C(I+1) | × | s7 | U(I) | D(I+1) |

| s4 | V(I) | T(I+1) | ← | s1 | V(I) | V(I+1) |  (TRANSFER BETWEEN REGISTERS)

| s12 | X(I) | W(I+1) | = | s4 | V(I) | T(I+1) | + | s11 | W(I) | U(I+1) |

| s12 | X(I) | X(I+1) | = | s1 | — | V(I+1) | + | s12 | X(I) | W(I+1) |

CODE GENERATION METHOD AND INFORMATION PROCESSING APPARATUS

CROSS-REFERENCE TO RELATED APPLICATION

This application is based upon and claims the benefit of priority of the prior Japanese Patent Application No. 2012-076510, filed on Mar. 29, 2012, the entire contents of which are incorporated herein by reference.

FIELD

The embodiments discussed herein are related to a code generation method and an information processing apparatus.

BACKGROUND

Some of the existing processors such as Central Processing Units (CPU) may perform the same type of operation on different data in parallel in response to one instruction called Single Instruction Multiple Data (SIMD) instruction. Such processors that execute SIMD instructions are provided with registers called SIMD registers, which store different data to be processed in parallel, in combination. For example, assume that a SIMD instruction of s1+s2 is input to a processor when data A1 and A2 are stored in a SIMD register s1 and data B1 and B2 are stored in a SIMD register s2. In this case, the processor performs two addition operations, A1+B1 and A2+B2, in parallel in response to the single instruction.

One of methods for generating code including a SIMD instruction is to search a plurality of non-SIMD instructions for two or more instructions which specify the same type of operations and are executable in parallel, and generate a SIMD instruction by combining the found instructions. For example, some of compliers that convert source code written in a high-level language into a machine-readable object code group two or more instructions into a SIMD instruction while performing an optimization process. The number of instructions that are possible to be grouped (parallelism) is different according to the architecture of a processor.

In this connection, there has been proposed a program processing method of converting source code into intermediate code written in a Register Transfer Language (RTL), extracting a set of instructions which specify the same type of operations to be applied to different data, from the intermediate code, and converting the set of instructions into a SIMD instruction. In addition, there has also been proposed a computer system which generates a trace dependency tree representing a dependency relationship among a plurality of instructions, searches the trace dependency tree for two or more instructions which are at the same level and specify the same type of operations, and merges the found instructions into a single SIMD instruction. Please see, for example, Japanese Unexamined Patent Publication No. 2003-202991 and International Publication Pamphlet No. WO2006/007193.

When generating a SIMD instruction, instructions which do not have a dependency relationship and are executable in parallel are combined. As a method of searching for such a combination of instructions, there is a method of using a tree representing a dependency relationship among instructions, as described above. When a plurality of trees (or a plurality of partial trees belonging to one big tree) is generated by analyzing code, the generated trees are compared with each other, and a combination pattern is found by combining instructions which belong to different trees and specify the same type of operations.

However, a plurality of trees generated by analyzing code may not have the same shape. Therefore, it may not be possible to find appropriate combinations of instructions only by comparing instructions at the same level as described above. Instructions at different levels may be possible to be combined. On the other hand, in order to find more combinations of instructions that are convertible into SIMD instructions, all combinations of instructions may be searched, irrespective of the tree structures. This searching, however, increases an amount of computation and causes efficiency loss.

SUMMARY

According to one aspect, there is provided a computer-readable storage medium storing a computer program for generating, from a first code, a specific instruction for performing a same type of operation on different data in parallel by combining two or more instructions included in the first code, and generating a second code including the specific instruction. The computer program causes a computer to perform a procedure including: generating first and second operation trees representing a dependency relationship among instructions included in the first code, computing a first operation sequence by arranging operations specified by instructions of the first operation tree in an order that matches a structure of the first operation tree, and computing a second operation sequence by arranging operations specified by instructions of the second operation tree in an order that matches a structure of the second operation tree; computing one or more longest operation subsequences of operation subsequences common to the first and second operation sequences; and evaluating, for each of two or more longest operation subsequences, when computed, utilization of computing resources used for executing combinations of instructions of the first and second operation trees corresponding to operations included in the longest operation subsequence, and selecting a combination pattern of instructions indicated by one of the two or more longest operation subsequences based on results of the evaluating.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 illustrates an example of source code;

FIG. 10 illustrates an example of LCS data;

FIGS. 12 to 14 illustrate the first to third examples of allocation of SIMD registers;

DESCRIPTION OF EMBODIMENTS

Figure 1:
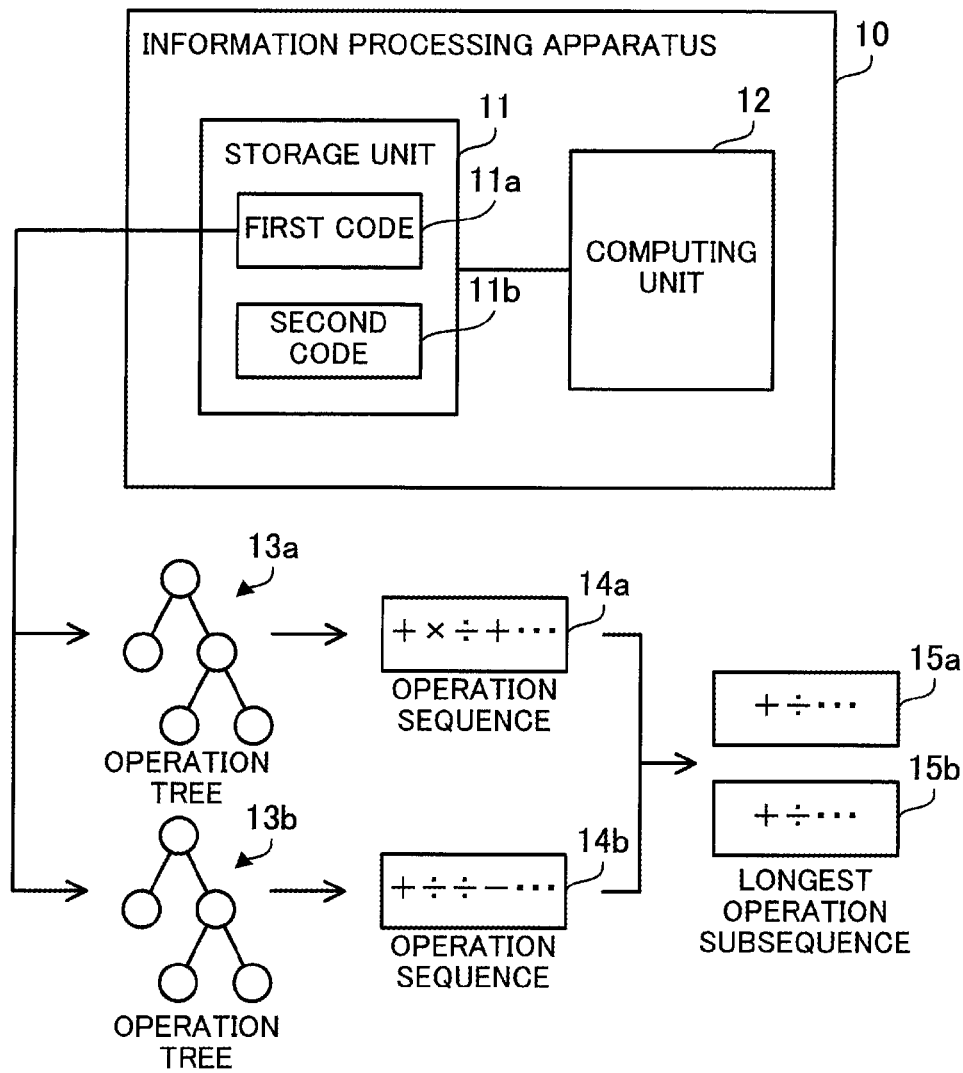
FIG. 1 illustrates an information processing apparatus according to a first embodiment.

Several embodiments will be described below with reference to the accompanying drawings, wherein like reference numerals refer to like elements throughout.

(a) First Embodiment

FIG. 1 illustrates an information processing apparatus according to a first embodiment. An information processing apparatus 10 generates second code 11b including SIMD instructions from first code 11a. The first code 11a is, for example, source code written in a high-level language or intermediate code generated by translating source code. The second code 11b is, for example, object code or execution code that a processor of the information processing apparatus 10 or another computer is able to read. The information processing apparatus 10 may be a client computer, such as a user's terminal device, or a server computer that terminal devices access. In this connection, a SIMD instruction is one example of a specific instruction for performing the same type of operation on different data in parallel.

The information processing apparatus 10 includes a storage unit 11 and a computing unit 12. The storage unit 11 stores the first code 11a and the second code 11b. The storage unit 11 may be implemented by using a volatile memory device such as a Random Access Memory (RAM), or a non-volatile storage device such as a Hard Disk Drive (HDD) or a flash memory. The computing unit 12 combines two or more instructions included in the first code 11a into a SIMD instruction, thereby generating the second code 11b. The computing unit 12 may be implemented by using a processor such as a CPU or Digital Signal Processor (DSP), or an electronic circuit other than a processor, such as an Application Specific Integrated Circuit (ASIC) or Field Programmable Gate Array (FPGA). The processor executes intended programs stored in the storage unit 11 or another memory, for example.

The computing unit 12 generates operation trees 13a and 13b representing a dependency relationship among the instructions included in the first code 11a. The dependency relationship includes a definition and reference relationship in which one instruction refers to data calculated by another instruction. The operation trees 13a and 13b are made up of different instructions. The operation trees 13a and 13b may be subtrees of one big operation tree. The computing unit 12 may generate three or more operation trees.

The computing unit 12 then generates an operation sequence 14a by arranging the operations specified by the instructions belonging to the operation tree 13a in the order that matches the structure of the operation tree 13a. The computing unit 12 also generates an operation sequence 14b by arranging the operations specified by the instructions belonging to the operation tree 13b in the order that matches the structure of the operation tree 13b. The operations include addition (+), subtraction (−), multiplication (×), and division (÷), as well as exponentiation operations (including operations for calculating reciprocal, square root, reciprocal of square root, etc.), transcendental function calculations (including sine, cosine, logarithm, exponential, etc.), remainder operations, code conversion, comparison operations, memory access (including loading, storing, etc.), etc. To arrange, in a sequence, a plurality of operations associated with each other in a tree structure, a backtracking depth-first search algorithm, a backtracking breadth-first search algorithm, or another algorithm may be employed.

Then, the computing unit 12 computes the longest one of operation subsequences common to the operation sequences 14a and 14b. An operation subsequence is obtained by taking out one or more operations from an original operation sequence without changing the sequence order. In the case where the operation sequences 14a and 14b are not identical, a common operation subsequence is found by deleting one or more operations from at least one of the operation sequences 14a and 14b. Thus computed longest operation subsequence may be called a longest common subsequence (LCS) of the operation sequences 14a and 14b. Two or more longest operation subsequences may be computed. For example, assuming that the operation sequence 14a is "+×÷+ . . . " and the operation sequence 14b is "+÷÷− . . . ", two longest operation subsequences are computed: one of which is a longest operation subsequence 15a of "+÷ . . . " obtained by extracting the first and third operations of the operation sequence 14a and the first and second operations of the operation sequence 14b; and the other of which is a longest operation subsequence 15b of "+÷ . . . " obtained by extracting the first and third operations of the operation sequence 14a and the first and third operations of the operation sequence 14b.

Then, the computing unit 12 determines combinations of an instruction belonging to the operation tree 13a and an instruction belonging to the operation tree 13b with reference to the computed longest operation subsequences. In the case where there is one longest operation subsequence computed, the computing unit 12 generates SIMD instructions by combining instructions of the operation trees 13a and 13b corresponding to the respective operations included in the longest operation subsequence. In the case where there are two or more longest operation sequences computed, on the other hand, the computing unit 12 evaluates, for each longest operation sequence, the utilization of computing resources used for executing SIMD instructions generated based on the longest operation subsequence, and selects one of the longest operation subsequences according to the evaluation results.

Some combinations of instructions may lead to generate, in addition to SIMD instructions, a transfer instruction for transferring data between SIMD registers. For example, assume that a first instruction is A1=B1+C1, a second instruction is A2=B2+C2, and a third instruction is D1=A2×C1, a fourth instruction is D2=A3×C2, and the SIMD parallelism is two. In this case, a first SIMD instruction may be generated by combining the first and second instructions, and a second SIMD instruction may be generated by combining the third and fourth instructions. As a result of executing the first SIMD instruction, the data A1 and A2 is stored in the same SIMD register. To execute the second SIMD instruction, the data A2 and A3 need to be stored in the same SIMD register. Therefore, these combinations need a transfer instruction between these first and second SIMD instructions. The more transfer instructions generated, the lower the efficiency of executing the generated second code 11b.

To deal with this, when evaluating computing resources, the computing unit 12 may evaluate the number of transfer instructions generated by adopting each longest operation subsequence, and select a longest operation subsequence with fewer transfer instructions. Alternatively, the computing unit 12 may calculate, with respect to each longest operation subsequence, the reduced number of instructions that are caused by conversion into SIMD instructions and the increased number of instructions that are caused by generating transfer instructions, evaluate substantive SIMD efficiency by subtracting the latter value from the former, and then select a longest operation subsequence with the highest SIMD efficiency.

According to the information processing apparatus 10 of the first embodiment, the operation trees 13a and 13b are converted into operation sequences 14a and 14b and then a longest operation subsequence is computed, so as to specify a combination pattern of instructions that provides the greatest number of instruction combinations between the operation trees 13a and 13b. At this time, the operation trees 13a and 13b do not need to be in the same shape. In addition, two instructions to be combined do not need to exist at the same level of the operation trees 13a and 13b. Further, when two or more longest operation subsequences are computed, a longest operation subsequence which enables better utilization of the computing resources used at the time of execution is selected. Therefore, it is possible to search for combinations of instructions efficiently.

(b) Second Embodiment

Figure 2:
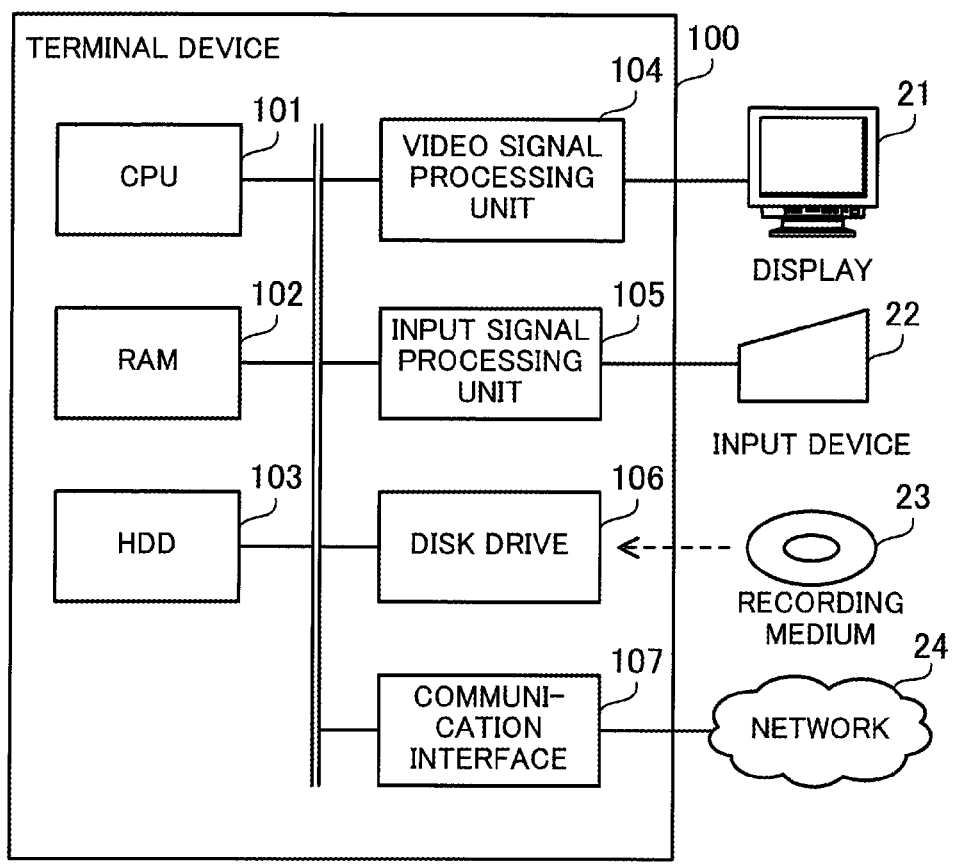
FIG. 2 is a block diagram illustrating example hardware components of a terminal device.

FIG. 2 is a block diagram illustrating example hardware components of a terminal device. The terminal device 100 of the second embodiment compiles source code written in a high-level language to generate machine-readable object code, and links a plurality of object codes to generate execution code for the terminal device 100 or another computer to execute. In this connection, these compiling and linking, which are described in the second embodiment, may be performed by using a server computer.

The terminal device 100 includes a CPU 101, RAM 102, HDD 103, video signal processing unit 104, input signal processing unit 105, disk drive 106, and communication interface 107. The CPU 101 is an example of the computing unit 12 of the first embodiment, and the RAM 102 and HDD 103 are examples of the storage unit 11 of the first embodiment.

The CPU 101 is a processor that includes a computing device to execute program instructions. The CPU 101 loads part or all of programs and data from the HDD 103 to the RAM 102, and then executes the programs. In this connection, the CPU 101 may be provided with a plurality of processor cores, and the terminal device 100 may be provided with a plurality of processors, so that processes to be described later may be performed in parallel with the plurality of processors or processor cores.

The RAM 102 is a volatile memory that temporarily stores programs and data to be used while the CPU 101 operates. In this connection, another type of memory, instead of RAM, or a plurality of memories may be provided in the terminal device 100.

The HDD 103 is a non-volatile storage device that stores software programs such as Operating System (OS), firmware, application software, etc., and data. In this connection, another type of storage device such as a flash memory or Solid State Drive (SSD), or a plurality of storage devices may be provided in the terminal device 100.

The video signal processing unit 104 outputs images on a display 21 connected to the terminal device 100 according to instructions from the CPU 101. As the display 21, a Cathode Ray Tube (CRT) display or liquid crystal display may be used.

The input signal processing unit 105 receives an input signal from an input device 22 connected to the terminal device 100, and supplies the signal to the CPU 101. As the input device 22, a pointing device such as a mouse, touch panel, etc., or a keyboard may be used.

The disk drive 106 is a driving device that reads programs and data from a recording medium 23. The recording medium 23 may be, for example, a magnetic disk such as Flexible Disk (FD), HDD, etc., an optical disc such as a Compact Disc (CD), Digital Versatile Disc (DVD), etc., or a Magneto-Optical disk (MO). The disk drive 106 stores programs and data read from the recording medium 23 in the RAM 102 or HDD 103 according to instructions from the CPU 101, for example.

The communication interface 107 enables communication with other computers over a network 24. The communication interface 107 may be a wired interface connected to a wired network or a wireless interface connected to a wireless network.

Figure 3:
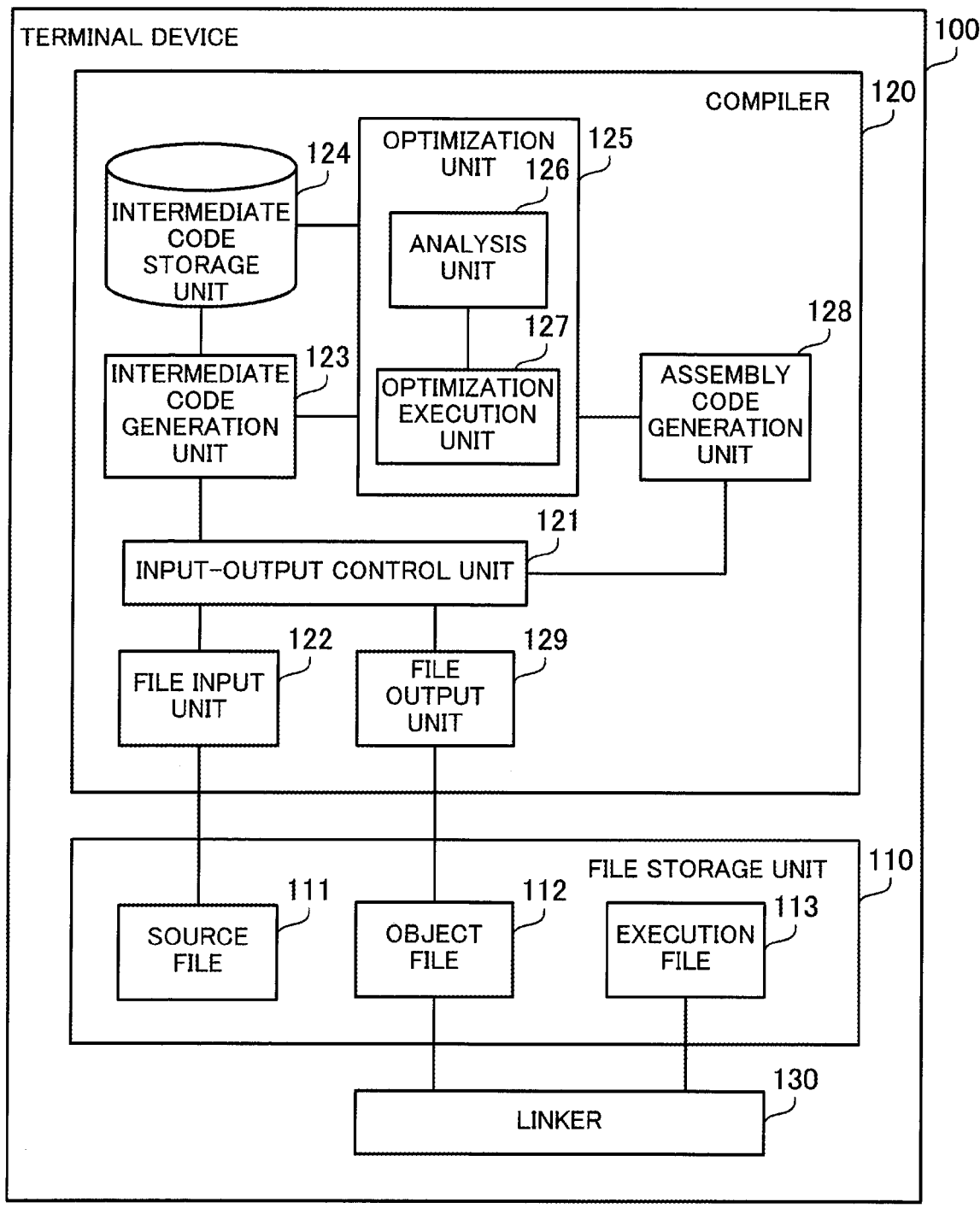
FIG. 3 is a block diagram illustrating example software components of the terminal device.

FIG. 3 is a block diagram illustrating example software components of a terminal device. The terminal device 100 includes a file storage unit 110, compiler 120, and linker 130. The file storage unit 110 is implemented by reserving a storage area of the RAM 102 or HDD 103. The compiler 120 and linker 130 are implemented as program modules that are executed by the CPU 101. In this connection, some or all of the functions of the compiler 120 and linker 130 may be implemented by using electronic circuits, not software programs.

The file storage unit 110 stores a source file 111, object file 112, and execution file 113. The source file 111 contains source code written in a high-level language. The object file 112 contains machine-readable object code including SIMD instructions. The execution file 113 is in such a format as to be executable by a processor that has a specific architecture to execute SIMD instructions. In this connection, the CPU 101 may be designed to be able to or not be able to execute the execution file 113.

The compiler 120 reads the source file 111 from the file storage unit 110, translates source code into object code, and stores the object file 112 in the file storage unit 110. The compiler 120 includes an input-output control unit 121, file input unit 122, intermediate code generation unit 123, intermediate code storage unit 124, optimization unit 125, assembly code generation unit 128, and file output unit 129.

The input-output control unit 121 selects an input-output method according to the type of a file, and controls the file input unit 122 and the file output unit 129. The file input unit 122 opens the source file 111 in response to an instruction from the input-output control unit 121, and reads source code from the source file 111. The intermediate code generation unit 123 analyzes the source code read by the file input unit 122 to translate the source code into intermediate code written in an intermediate language, which is used by the compiler 120, and stores the intermediate code in the intermediate code storage unit 124. The analysis of source code includes lexical analysis, structure analysis, semantic analysis, etc. The intermediate code storage unit 124 is a storage area reserved in the RAM 102, and stores intermediate code.

The optimization unit 125 optimizes intermediate code stored in the intermediate code storage unit 124 in order to speed up execution. The optimization unit 125 includes an analysis unit 126 and optimization execution unit 127. The analysis unit 126 analyzes intermediate code to determine an optimization method. When determining an optimization method, the analysis unit 126 also determines combinations of instructions to be converted into SIMD instructions from the instructions included in the intermediate code. The optimization execution unit 127 optimizes the intermediate code with the optimization method determined by the analysis unit 126. In the optimization, the optimization execution unit 127 also converts the instructions included in the intermediate code to SIMD instructions.

The assembly code generation unit 128 converts the optimized intermediate code into assembly code that is written in an assembly language, which is a low-level language. The file output unit 129 generates an object file 112 in response to an instruction from the input-output control unit 121. The file output unit 129 then translates the assembly code generated by the assembly code generation unit 128 to object code, and writes the object code to the object file 112.

The linker 130 reads the object file 112 from the file storage unit 110, analyzes the object code to detect other object files and libraries to be referenced. The linker 130 then links the object file 112 with the detected other object files and libraries to generate the execution file 113. In this connection, the functions of the linker 130 may be provided in the compiler 120.

The following describes how to execute a SIMD instruction in a processor.

Figure 4:
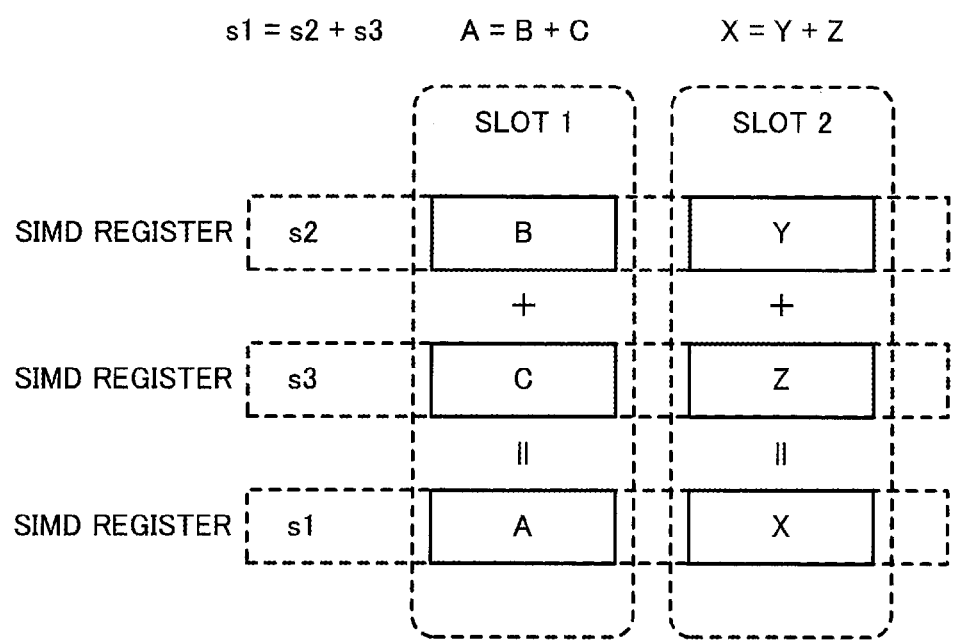
FIG. 4 illustrates an example of a relationship between a SIMD instruction and SIMD registers.

FIG. 4 illustrates an example of a relationship between a SIMD instruction and SIMD registers. A processor that is able to execute SIMD instructions includes SIMD registers that store data to be processed in parallel, in combination. Each SIMD register includes as many subregisters as the value of the parallelism determined according to the processor architecture. FIG. 4 illustrates the case where the parallelism is two.

For example, as illustrated in FIG. 4, consider the case of converting two instructions, A=B+C and X=Y+Z, into a single SIMD instruction, s1=s2+s3. Data B, data Y, data C, and data Z are stored in the subregister 1 of the SIMD register s2, the subregister 2 of the SIMD register s2, the subregister 1 of the SIMD register s3, and the subregister 2 of the SIMD register s3, respectively. In this case, in response to the SIMD instruction, two additions are executed in parallel to thereby calculate data A and X which is then stored in the subregisters 1 and 2 of the SIMD register s1, respectively.

In this connection, a set of subregisters located at the same location is called a slot. More specifically, each subregister 1 of the SIMD registers s1, s2, and s3 belongs to a slot 1, and each subregister 2 of the SIMD registers s1, s2, and s3 belongs to a slot 2. In a SIMD instruction, one operation is performed using a plurality of subregisters belonging to the same slot.

Figure 5A:
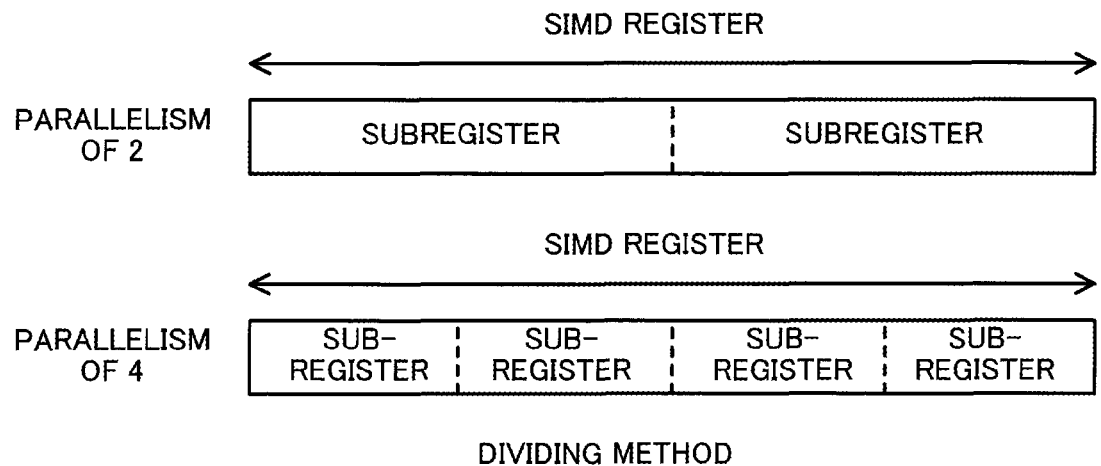
FIGS. 5A and 5B illustrate examples of implementation of SIMD registers.
Figure 5B:
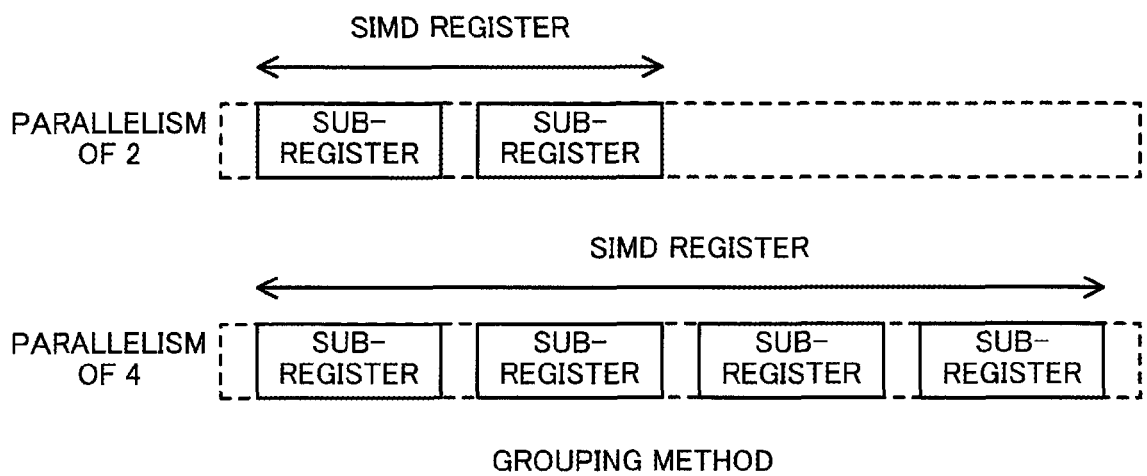

FIGS. 5A and 5B illustrate examples of implementation of SIMD registers. For implementing SIMD registers in a processor, there are a dividing method illustrated in FIG. 5A and a grouping method illustrated in FIG. 5B.

The dividing method is to logically divide one large physical register into a plurality of subregisters of the same size. In the case of a parallelism of two, the storage area of the physical register is divided into halves. In the case of a parallelism of four, the storage area of the physical register is divided into four. In the case where the size of a physical register is fixed, the greater the parallelism, the smaller the number of bits in each subregister. In this dividing method, a SIMD register refers to a physical register, and a subregister refers to a logical register.

On the other hand, in the grouping method, a SIMD register is formed by grouping and using as subregisters a plurality of physical registers with the same number of bits. In the case of a parallelism of two, a set of two physical registers is used as a SIMD register. In the case of a parallelism of four, a set of four physical registers is used as a SIMD register. In the case where physical registers of the same size are used, the greater the parallelism, the greater the number of bits in a SIMD register. In this grouping method, a SIMD register refers to a logical register, and a subregister refers to a physical register.

The following describes a problem that occurs in selecting a combination of instructions to be converted into a SIMD instruction.

Figure 6:
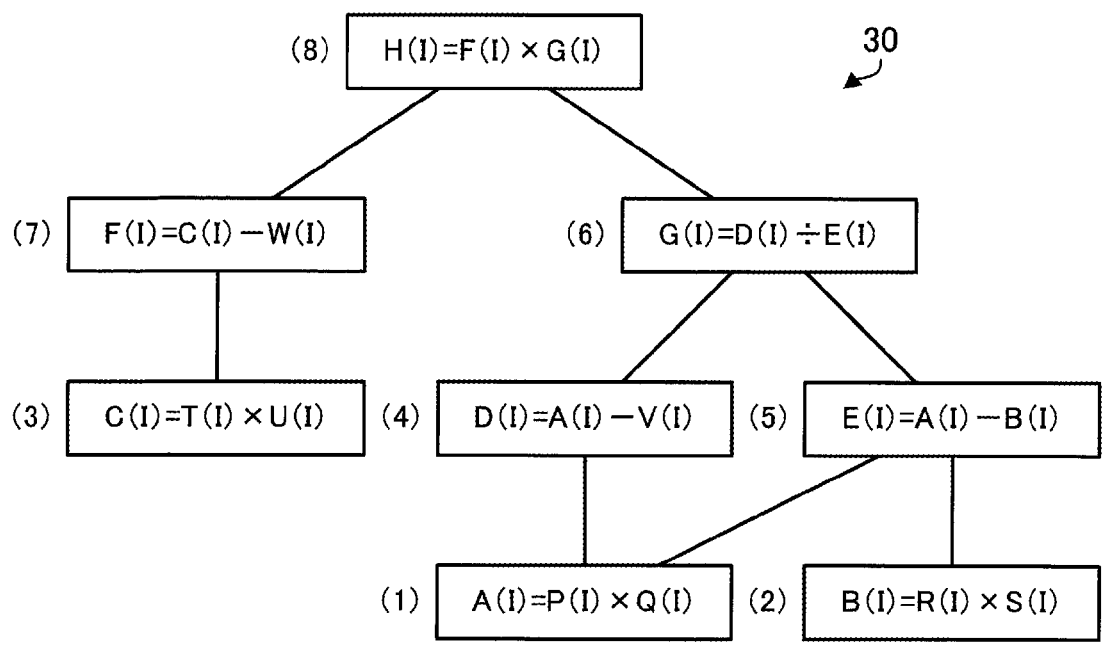
FIG. 6 illustrates an example of a dependency relationship among instructions.

FIG. 6 illustrates an example of a dependency relationship among instructions. An instruction dependency graph 30 represents a dependency relationship among instructions included in intermediate code. Here, consider the case where eight instructions are included in a block of code (in a translation block) which the compiler 120 processes at a time. Referring to FIG. 6, each instruction 1, 2, 3, and 8 performs a multiplication "×", each instruction 4, 5, and 7 performs a subtraction "−", and an instruction 6 performs a division "÷". The instruction 4 refers to the result of the operation of the instruction 1, the instruction 5 refers to the results of the operations of the instructions 1 and 2, the instruction 6 refers to the results of the operations of the instructions 4 and 5, the instruction 7 refers to the result of the operation of the instruction 3, and the instruction 8 refers to the results of the operations of the instructions 6 and 7. In this connection, in FIG. 6, the instructions are written in a high-level language for easy understanding.

By searching the instructions at the same depth from the root of such an instruction dependency graph 30 for combinations of instructions to be converted into SIMD instructions (to be SIMD-ized), a combination of instructions 1 and 2 that perform multiplication and a combination of instructions 4 and 5 that perform subtraction are selected. However, these combinations of instructions 1 and 2 and instructions 4 and 5 are not optimal for the following reasons.

Figure 7:
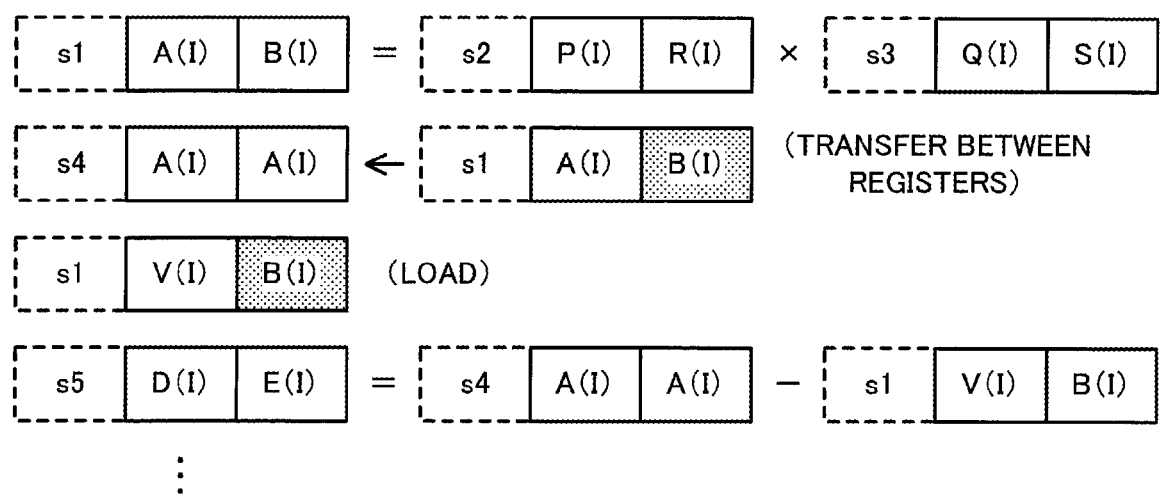
FIG. 7 illustrates an example of a transfer instruction that is produced by conversion to SIMD.

FIG. 7 illustrates an example of a transfer instruction that is produced by conversion to SIMD. When a SIMD instruction that is a combination of the instructions 1 and 2 is executed, data A(I) calculated by the instruction 1 and data B(I) calculated by the instruction 2 are stored in the SIMD register s1. On the other hand, the instruction 4 refers to the data A(I) and V(I), and the instruction 5 refers to the data A(I) and B(I). Therefore, to execute a SIMD instruction that is a combination of the instructions 4 and 5, the data A(I) and A(I) need to be stored in the same SIMD register, and the data V(I) and B(I) need to be stored in the same SIMD register. Therefore, a transfer instruction is inserted between the two SIMD instructions. Referring to the example of FIG. 7, the data A(I) is transferred from the SIMD register s1 to the SIMD register s4, and the data V(I) is loaded to the slot 1 of the SIMD register s1.

The above data transfer between SIMD registers is avoided if the instructions 1 and 3 at different levels are combined into a SIMD instruction and the instructions 5 and 7 at different levels are combined into a SIMD instruction. That is to say, optimal combinations of instructions may not be found with the above method of only comparing instructions at the same level in the instruction dependency graph 30. In addition, instructions that perform the same type of operations may not exist at the same level, depending on a dependency relationship among instructions. To deal with this, one of methods is to search for optimal combinations by testing all different combinations of instructions appearing in a predetermined block of intermediate code. However, this method of testing all different combinations of instructions increases the amount of computation to "$O(N^N)$" where N is the number of instructions appearing in the predetermined block.

The optimization unit 125 searches for combinations of instructions with a method that is described below.

FIG. 8 illustrates an example of source code. It is assumed that a source file 111 contains ten instructions in a translation block as illustrated in FIG. 8. Each instruction 1, 2, 3, 5, 6, 8, 9, and 10 performs an addition "+", and each instruction 4 and 7 performs a multiplication "×". The instruction 4 refers to the results of the operations of the instructions 1 and 2, and the instruction refers to the results of the operations of the instructions 3 and 4. The instruction 9 refers to the results of the operations of the instructions 6 and 7, and the instruction 10 refers to the results of the operations of the instructions 8 and 9. That is to say, a set of the instructions 1 to 5 and a set of the instructions 6 to 10 have no dependency relationship and so are executable in parallel.

Figure 9:
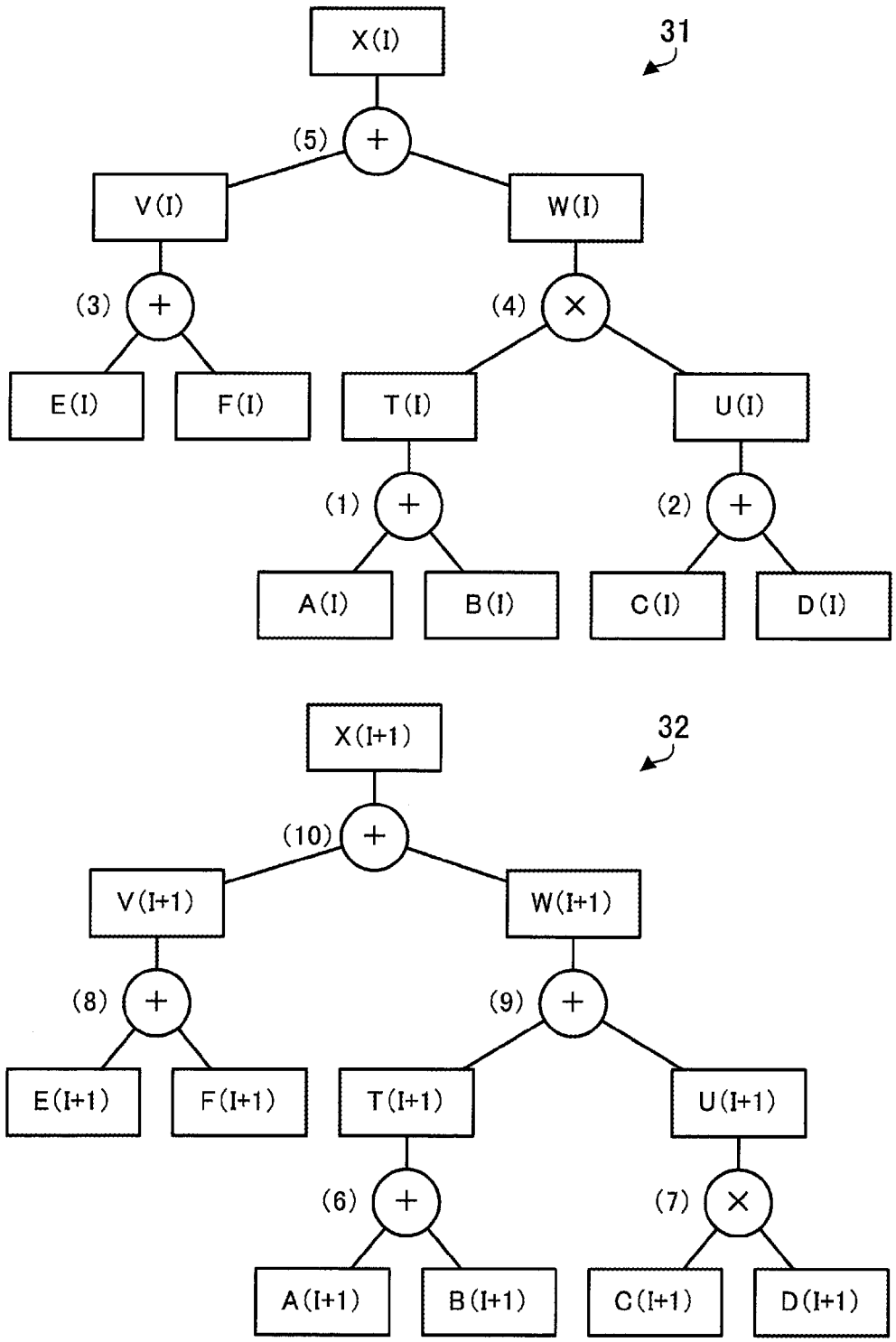
FIG. 9 illustrates a first example of operation trees.

FIG. 9 illustrates a first example of operation trees. The optimization unit 125 generates operation trees 31 and 32 illustrated in FIG. 9, from the source file 111 of FIG. 8. Each operation tree 31 and 32 represents, in a tree structure, a relationship among operations to be executed in instructions, data to be referenced in the instructions, and data defined (calculated) by the instructions. In the operation trees 31 and 32, data that is a starting point of a series of operations is written in a leaf, and data to be defined as a result of the series of operations is written in a root. A series of operations is performed from a leaf to the root while a higher-level operation refers to the result of a lower-level operation.

The operation tree 31 is generated from the instructions 1 to 5, and the operation tree 32 is generated from the instructions 6 to 10. As described earlier, the set of instructions 1 to 5 and the set of instructions 6 to 10 have no dependency relationship, so the operation trees 31 and 32 are generated as separate trees. The instructions belonging to the operation tree 31 and the instructions belonging to the operation tree 32 are executable in parallel. Therefore, the optimization unit 125 determines combinations of instructions to be SIMD-ized, with reference to the operation trees 31 and 32.

To search for combinations of instructions to be SIMD-ized, the optimization unit 125 first convers the operation trees 31 and 32 to operation sequences. To this end, the optimization unit 125 first tracks the nodes of the operation trees 31 and 32 with the backtracking depth-first search or the backtracking breadth-first search. By tracking the nodes of the operation tree 31 with the backtracking depth-first search, a code sequence of E(I), F(I), +, A(I), B(I), +, C(I), D(I), +, ×, + is generated. In this connection, description of defined data is omitted. Similarly, by tracking the nodes of the operation tree 32 with the backtracking depth-first search, a code sequence of E(I+1), F(I+1), +, A(I+1), B(I+1), +, C(I+1), D(I+1), ×, +, × is generated. Thus generated code sequence corresponds to a series of operations described in the Reverse Polish Notation (Postfix Notation).

Then, the optimization unit 125 extracts, as operation sequences, only operations (+, −, ×, ÷, etc.) from the code sequences generated from the respective operation trees 31 and 32. That is, the operation sequence corresponding to the operation tree 31 is +++×+, and the operation sequence corresponding to the operation tree 32 is ++×++. The optimization unit 125 computes an LCS of the two operation sequences generated from the operation trees 31 and 32 to detect candidate combinations between the instructions of the operation tree 31 and the instructions of the operation tree 32.

FIG. 10 illustrates an example of LCS data. An LCS is the longest one of partial sequences that are commonly included in two sequences. A partial sequence here is made up of one or more elements extracted from a sequence without changing its order. The optimization unit 125 computes LCSs between two operation sequences, and generates LCS data 141 listing the LCSs.

There are seven LCSs with a length of four between the operation sequence 1 of +++×+ corresponding to the operation tree 31 and the operation sequence 2 of ++×++ corresponding to the operation tree 32. Out of the seven LCSs, one LCS has a pattern of ++++, and the other LCSs have a pattern of ++×+.

(1) The first, second, third, and fifth operations of the operation sequence 1 and the first, second, fourth, and fifth operations of the operation sequence 2 are selected. This indicates a combination of instructions 3 and 8, a combination of instructions 1 and 6, a combination of instructions 2 and 9, and a combination of instructions 5 and 10.

(2) The first, second, fourth, and fifth operations of the operation sequence 1 and the first, second, third, and fourth operations of the operation sequence 2 are selected. This indicates a combination of instructions 3 and 8, a combination of instructions 1 and 6, a combination of instructions 4 and 7, and a combination of instructions 5 and 9.

(3) The first, second, fourth, and fifth operations of the operation sequence 1 and the first, second, third, and fifth operations of the operation sequence 2 are selected. This indicates a combination of instructions 3 and 8, a combination of instructions 1 and 6, a combination of instructions 4 and 7, and a combination of instructions 5 and 10.

(4) The second, third, fourth, and fifth operations of the operation sequence 1, and the first, second, third, and fourth operations of the operation sequence 2 are selected. This indicates a combination of instructions 1 and 8, a combination of instructions 2 and 6, a combination of instructions 4 and 7, and a combination of instructions 5 and 9.

(5) The second, third, fourth, and fifth operations of the operation sequence 1 and the first, second, third, and fifth operations of the operation sequence 2 are selected. This indicates a combination of instructions 1 and 8, a combination of instructions 2 and 6, a combination of instructions 4 and 7, and a combination of instructions 5 and 10.

(6) The first, third, fourth, and fifth operations of the operation sequence 1 and the first, second, third, and fourth operations of the operation sequence 2 are selected. This indicates a combination of instructions 3 and 8, a combination of instructions 2 and 6, a combination of instructions 4 and 7, and a combination of instructions 5 and 9.

(7) The first, third, fourth, and fifth operations of the operation sequence 1 and the first, second, third, and fifth operations of the operation sequence 2 are selected. This indicates a combination of instructions 3 and 8, a combination of instructions 2 and 6, a combination of instructions 4 and 7, and a combination of instructions 5 and 10.

Figure 11:
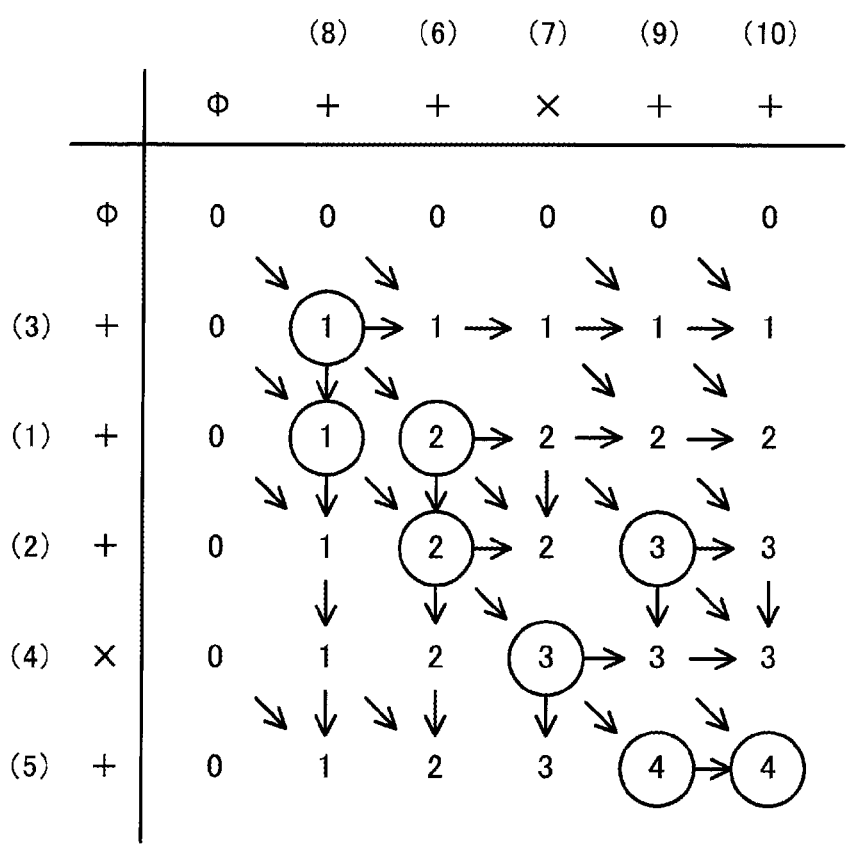
FIG. 11 illustrates an example of how to compute an LCS.

FIG. 11 illustrates an example of how to compute an LCS. For example, the optimization unit 125 creates a matrix M as illustrated in FIG. 11, and computes an LCS with dynamic programming. First, the optimization unit 125 maps the operation sequence 1 to the first to fifth rows, and the operation sequence 2 to the first to fifth columns. In addition, the entries (M[0,0] to M[0,5]) in the 0th row and the entries (M[0,0] to M[5,0]) in the 0th column are all set to a value of 0. Then, the values in the other entries are calculated according to the following rules, starting from the upper left (M[1, 1]) and proceeding toward the bottom right (M[5,5]) of the matrix M.

The value of M[i, j] is calculated as follows. In the case where the i-th operation of the operation sequence 1 is the same as the j-th operation of the operation sequence 2, the largest value is selected from (a1) a value calculated by adding the value of the upper left entry M[i−1, j−1] and one, (b1) the value of the left entry M[i, j−1], and (c1) the value of upper entry M[i−1, j], and is taken as the value of M[i, j]. In the case where the i-th operation of the operation sequence 1 is different from the j-th operation of the operation sequence 2, the largest value is selected from (a2) the value of the upper left entry M[i−1, j−1], (b2) the value of the left entry M[i, j−1], and (c2) the value of the upper entry M[i−1, j], and is taken as the value of M[i, j].

The value of M[5,5] calculated according to the above rules indicates the length of an LCS between the operation trees 31 and 32. Then, the LCS is computed by tracking the path generated for calculating the value of M[5,5] backwards, i.e., from M[5,5] toward the upper left of the matrix M. The operations included in the LCS are operations each of which corresponds to the row and column of an entry located immediately before the value is changed to a smaller one during the tracking of the path from M[5,5] toward the upper left. For example, in the case of tracking a path from M[4,3]=3 to M[3,2]=2, an operation "×" corresponding to M[4,3] is included in an LCS.

What an LCS has a length of four means that four SIMD instructions at maximum are generated by combining four instructions belonging to the operation tree 31 and four instructions belonging to the operation tree 32. The combination patterns of instructions indicated by the above-described seven LCSs have no difference in the number of instructions that are convertible into SIMD instructions. However, these combination patterns are different in the efficiency of executing generated object code. In addition, even in the case where four combinations of instructions are convertible into SIMD instructions, the case where some of the instruction combinations are not SIMD-ized may be able to improve the efficiency of executing generated object code.

FIG. 12 illustrates a first example of allocation of SIMD registers. This example describes the case of converting all of four instruction combinations into SIMD instructions in the above-described first combination pattern. As illustrated in FIG. 12, twelve SIMD registers are used to execute the four SIMD instructions. In addition, one transfer instruction is inserted between the second SIMD instruction generated from the instructions 1 and 6 and the third SIMD instruction generated from the instructions 2 and 9.

That is, the conversion to SIMD reduces the number of instructions by four, but increases the number of instructions by one due to the transfer instruction. Therefore, the number of SIMD instructions generated (the effective number of SIMD instructions) with canceling out any losses due to transfer instructions is three. If the instructions 2 and 9 are not converted into a SIMD instruction (if the third SIMD instruction of s11=s10+s7 is not generated), a transfer instruction is not produced.

FIG. 13 illustrates a second example of allocation of SIMD registers. This example describes the case of not converting the instructions 2 and 9 into a SIMD instruction but converting the remaining three instruction combinations into SIMD instructions, out of the four instruction combinations included in the above-described first combination pattern. In this SIMD approach of FIG. 13, the number of SIMD registers used and the total number of instructions are the same as those of the case of FIG. 12. However, the SIMD approach of FIG. 13 does not insert any transfer instructions between SIMD instructions. Existence of transfer instructions means that a transfer instruction and the SIMD instructions before and after the transfer instruction have a dependency relationship, which needs to place constrains on the order of executing the instructions and thus may lower the efficiency of executing object code. Therefore, the SIMD approach of FIG. 13 is advantageous over that of FIG. 12.

FIG. 14 illustrates a third example of allocation of SIMD registers. This example describes the case of converting all of the four instruction combinations into SIMD instructions in the above-described second combination pattern. In this SIMD approach of FIG. 14, twelve SIMD registers are used, and the total number of instructions is eight. In addition, since two transfer instructions are inserted, the effective number of SIMD instructions is two. Therefore, the SIMD approach of FIG. 14 is more disadvantageous than those of FIGS. 12 and 13.

As described above, the utilization of resources by a processor is evaluated for each combination pattern of instructions indicated by computed LCSs, assuming that some or all of the combinations of instructions included in the combination pattern are SIMD-ized. The optimization unit 125 adopts a SIMD approach which provides the most advantageous utilization of resources. As an evaluation index for evaluating the resource utilization, the number of SIMD registers used, the total number of instructions, the number of transfer instructions, the effective number of SIMD instructions, etc. may be used. In addition, as the evaluation index, the size of a used area of a memory, the length of a critical path (the longest one of paths generated by arranging dependency relationships among instructions in series), the execution time, the power consumption of a processor, etc. may also be used.

When evaluating the above-described seven combination patterns in terms of the effective number of SIMD instructions, the first and third combination patterns are determined optimal. In the above examples, instructions that perform four arithmetic operations (addition, subtraction, multiplication, and division) are SIMD-ized. In addition to these, instructions that perform other types of operations and memory accesses may be SIMD-ized. In addition, combinations of instructions to be SIMD-ized may be determined, not only from the operation trees 31 and 32 formed in the same shape, as described above, but also from two operation trees having different shapes.

Figure 15:
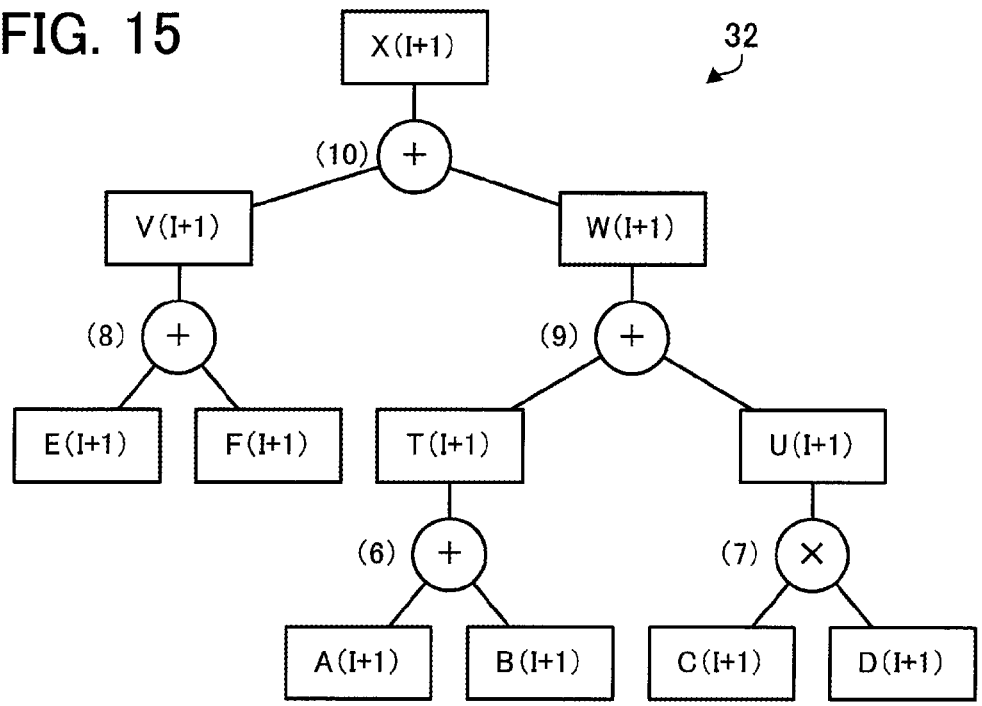
FIG. 15 illustrates a second example of operation trees.
Figure 15:
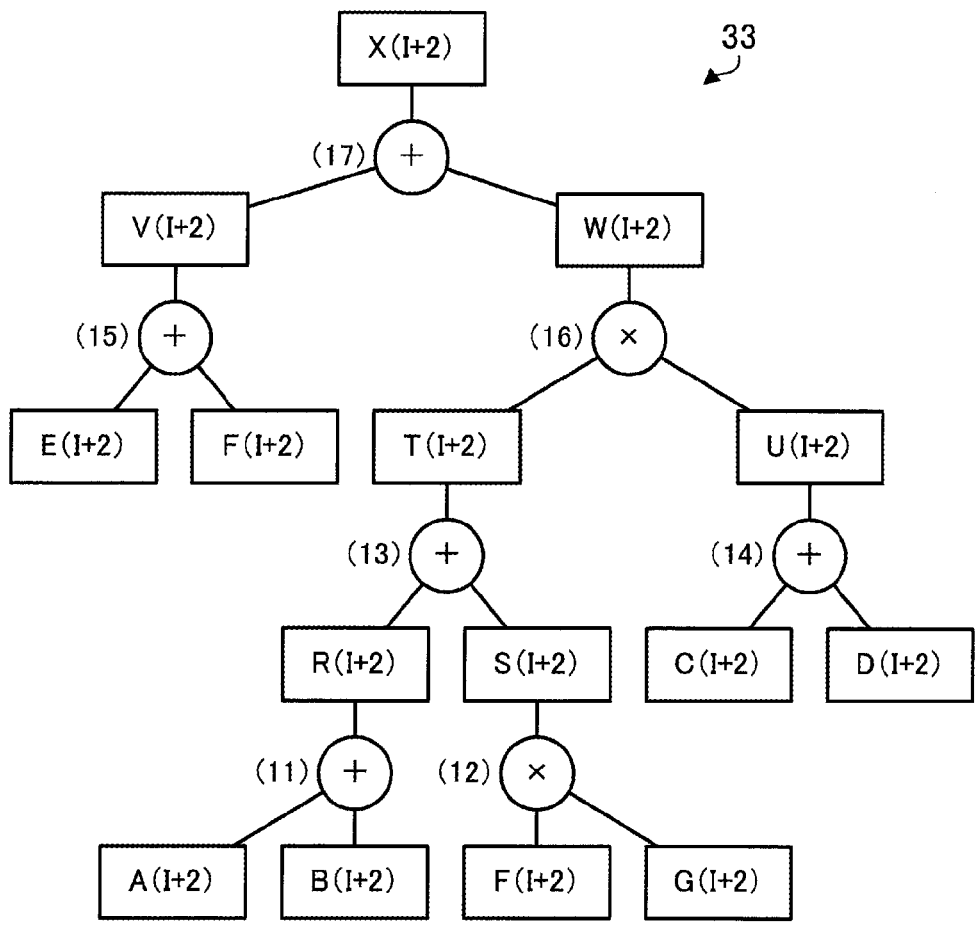

FIG. 15 illustrates a second example of operation trees. An operation tree 33 is generated from instructions 11 to 17. Each instruction 11, 13, 14, 15, and 17 performs an addition "+", and each instruction 12 and 16 performs a multiplication "×". The instruction 13 refers to the results of the operations of the instructions 11 and 12, the instruction 16 refers to the results of the operations of the instructions 13 and 14, and the instruction 17 refers to the results of the operations of the instructions 15 and 16. The instructions belonging to the operation tree 32 and the instructions belonging to the operation tree 33 have no dependency relationship.

By searching the operation trees 32 and 33 for instruction combinations to be SIMD-ized in the same way as the above-described case of the operation trees 31 and 32, the following five instruction combinations are selected: instructions 6 and 11, instructions 7 and 12, instructions 9 and 13, instructions 8 and 15, and instructions 10 and 17. In this way, the optimization unit 125 is able to find instruction combinations to be SIMD-ized from two operation trees having different shapes. At this time, a combination of instructions at different levels may be selected as an instruction combination to be SIMD-ized.

The following describes cross Fused Multiply and Add (FMA) instructions that are supported by some processor architectures. An FMA instruction specifies an operation which is a combination of multiplication, and addition or subtraction. For example, an operation of A×B+C is specified as a single FMA instruction. It is possible to convert a combination of two or more FMA instructions having the same type of operations into a SIMD instruction. For example, an FMA instruction of A×B+C and an FMA instruction of X×Y+Z may be converted into a single SIMD instruction.

A cross FMA instruction is generated by extending a SIMD instruction generated from FMA instructions. In the cross FMA instruction, operations are performed on data, assuming that the data is virtually transferred or copied between slots, even without a transfer instruction inserted. If operations of A×B+C and X×Y+C are specified by using a cross FMA instruction, the data C is treated in the cross FMA instruction as if it were virtually copied, without having been copied.

Executing the execution file 113 with a processor which supports cross FMA instructions may avoid producing transfer instructions due to conversion to SIMD. Therefore, the optimization unit 125 evaluates the utilization of resources for each SIMD approach, taking into account whether cross FMA instructions are executable or not. In this connection, to generate a cross FMA instruction by combining non-FMA instructions, one piece of data to be multiplied is set to "1" or one piece of data to be added is set to "0".

Figure 16:
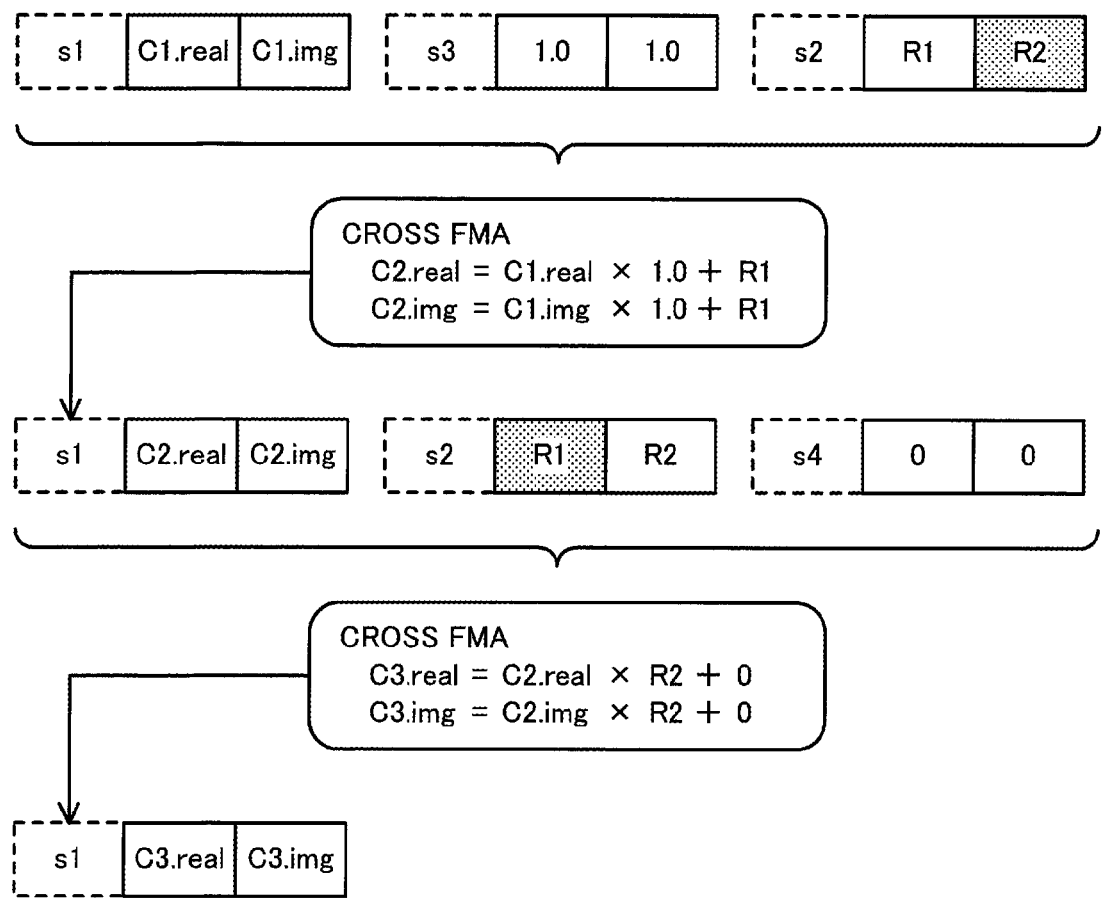
FIG. 16 illustrates an example of executing cross FMA instructions.

FIG. 16 illustrates an example of executing cross FMA instructions. This example describes the case where source code contains the following four instructions: instruction 1 is C2.real=C1.real+R1; instruction 2 is C2.img=C1.img+R1; instruction 3 is C3.real=C2.real×R2; and instruction 4 is C3.img=C2.img×R2.

The instructions 1 and 2 are interpreted as C2.real=C1.real×1.0+R1 and C2.img=C1.img×1.0+R1, respectively, so that these instructions are taken as FMA instructions. In addition, the instructions 3 and 4 are interpreted as C3.real=C2.real×R2+0 and C3.img=C2.img×R2+0, respectively, so that these instructions are taken as FMA instructions. Then, cross FMA instructions are generated from the combination of instructions 1 and 2 and the combination of instructions 3 and 4.

For example, C1.real and C1.img are stored in the SIMD register s1, R1 and R2 are stored in the SIMD register s2, and 1.0 and 1.0 are stored in the SIMD register s3. By executing the cross FMA instruction generated from the instructions 1 and 2 under this condition, R1 in the SIMD register s2 is treated as if it were virtually copied, and thereby C2.real and C2.img are calculated. At this time, R1 in the SIMD register s2 is not physically moved. Similarly, by executing the cross FMA instruction generated from the instructions 3 and 4 under the condition where 0 and 0 are stored in the SIMD register s4, R2 in the SIMD register s2 is treated as if it were virtually copied, and thereby C3.real and C3.img are calculated. At this time, R2 in the SIMD register s2 is not physically moved.

The following describes processes performed by the analysis unit 126.

Figure 17:
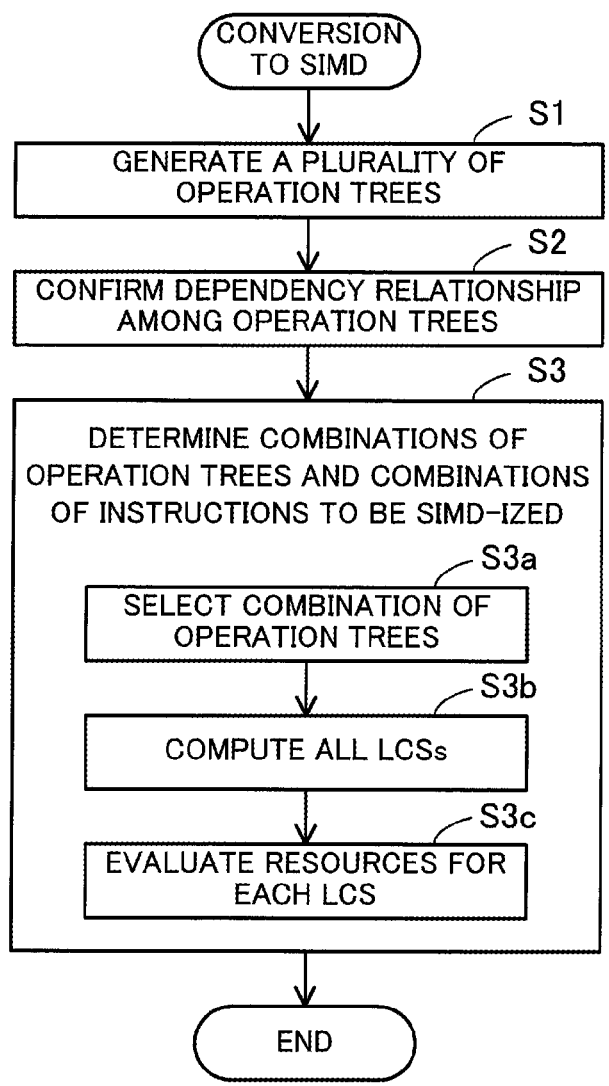
FIG. 17 is a flowchart illustrating an exemplary procedure of performing conversion to SIMD.

FIG. 17 is a flowchart illustrating an exemplary procedure of performing conversion to SIMD.

At step S1, the analysis unit 126 reads intermediate code of one translation block from the intermediate code storage unit 124, and analyzes a dependency relationship among the instructions included in the read intermediate code. The analysis unit 126 then generates a plurality of operation trees based on the dependency relationship among the instructions.

At step S2, the analysis unit 126 confirms a dependency relationship among the operation trees generated at step S1. The dependency relationship among the operation trees are confirmed by comparing the root node of an operation tree with that of another operation tree, and comparing a leaf of the operation tree with the root node of the other operation tree.

At step S3, the analysis unit 126 determines combinations from the plurality of operation trees generated at step S1 and combinations of instructions to be SIMD-ized in each combination of operation trees. At this time, operation trees determined at step S2 to have a dependency relationship are not combined. In addition, the number of operation trees belonging to one combination is equal to the SIMD parallelism. Step S3 includes the following steps S3a, S3b, and S3c.

At step S3a, the analysis unit 126 selects one combination of operation trees.

At step S3b, the analysis unit 126 converts each of the operation trees belonging to the combination selected at step S3a into an operation sequence, and computes all LCSs among the plurality of operation sequences.

At step S3c, the analysis unit 126 evaluates, for each LCS computed at step S3b, the utilization of resources used for adopting the combination pattern of instructions indicated by the LCS. The analysis unit 126 then selects a combination of instructions with the best evaluation result.

The following describes an example of how to implement the procedure of FIG. 17. A procedure of generating operation trees from intermediate code will be first described.

Figure 18:
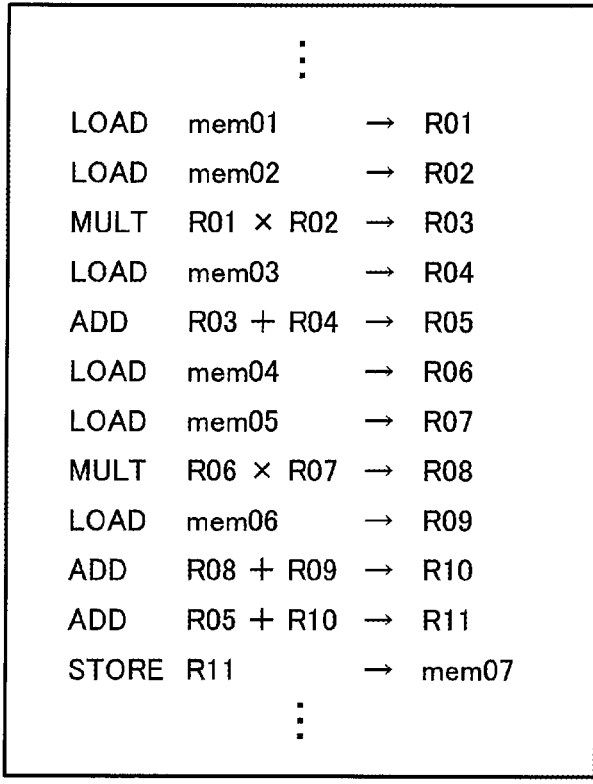
FIG. 18 illustrates an example of intermediate code.

FIG. 18 illustrates an example of intermediate code. Intermediate code 142 is stored in the intermediate code storage unit 124. The intermediate code 142 includes instructions 1 to 12 in one translation block. The instructions 1, 2, 4, 6, 7, and 9 are LOAD instructions for reading data from a RAM. The instruction 12 is a STORE instruction for writing data to the RAM. The instructions 3 and 8 are MULT (multiplication) instructions, and the instructions 5, 10, and 11 are ADD (addition) instructions.

The instruction 3 depends on the instructions 1 and 2, the instruction 5 depends on the instructions 3 and 4, the instruction 8 depends on the instructions 6 and 7, the instruction 10 depends on the instructions 8 and 9, the instruction 11 depends on the instructions 5 and 10, and the instruction 12 depends on the instruction 11. In this connection, R01, R02, R03, R04, R05, R06, R07, R08, R09, R10, and R11 in FIG. 18 represent logical registers.

The analysis unit 126 scans an instruction sequence from backward to forward, and generates an operation tree by analyzing a dependency relationship among the instructions. One operation tree is generated from the instructions 1 to 12. To represent the dependency relationship with an operation tree in tree structure, the dependency relationship is limited to a dependency relationship relating to registers each of which is defined only once by a single instruction and is referenced only once by another instruction.

Figure 19:
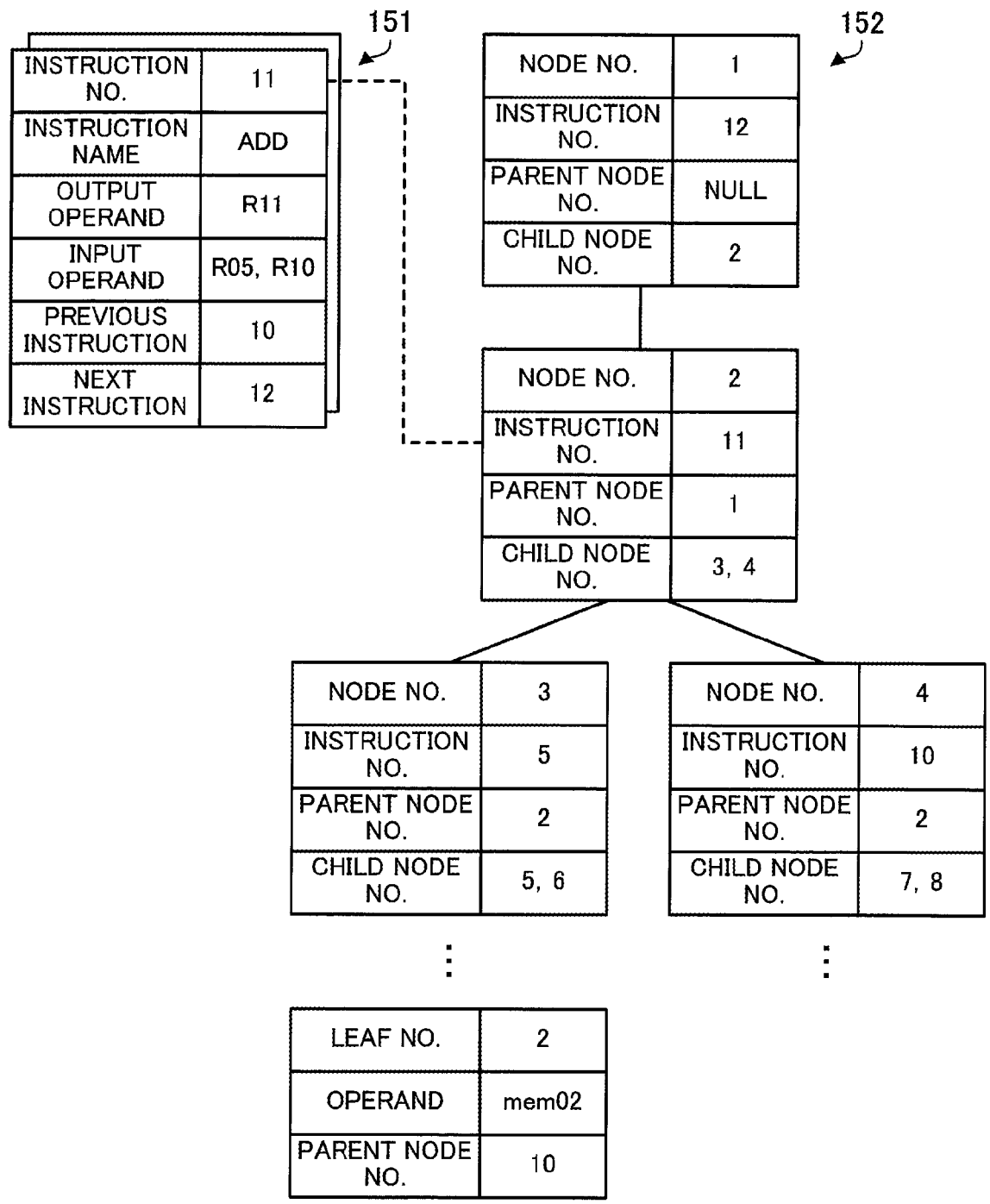
FIG. 19 illustrates an example of instruction data and operation tree data.

FIG. 19 illustrates an example of instruction data and operation tree data. The analysis unit 126 extracts instructions one by one from the intermediate code 142 to generate instruction data 151, analyzes the instruction data 151 to determine a dependency relationship among the instructions, and generates operation tree data 152.

The instruction data 151 is generated for each instruction and includes columns for instruction number (No.), instruction name, output operand, input operand, previous instruction, and next instruction. The instruction number is a number identifying an instruction. The instruction name is a name (ADD, SUB, MULT, DIV, etc.) identifying the type of the operation. The output operand column contains an identifier of a logical register used in the intermediate code 142, that is, the identifier of a register that stores the result data of the operation. The input operand column contains the identifiers of one or more registers for storing data to be referenced. The previous instruction column contains an instruction number identifying a previous instruction in the intermediate code 142. The next instruction column contains an instruction number identifying a next instruction.

The operation tree data 152 includes node data and leaf data.

The node data includes columns for node number, instruction number, parent node number, and child node number. The node number is a number identifying a node of an operation tree. The instruction number is the same as that included in the instruction data 151. The instruction data 151 and the operation tree data 152 are associated with each other by an instruction number. The parent node number is a node number corresponding to another instruction that refers to the output operand of the instruction of the own node. The child node number is a node number corresponding to another instruction that defines an input operand of the instruction of the own node. The node data corresponding to a plurality of nodes is associated with each other by using parent node numbers and child node numbers.

The leaf data includes columns for leaf number, operand, and parent node number. The leaf number is a number identifying a leaf of an operation tree. The operand column contains an identifier identifying a storage area of the RAM to be accessed for loading data to a register. The parent node number is a node number of a node having a dependency relationship with the leaf.

Figure 20:
FIG. 20 illustrates an example of an operation tree list.

FIG. 20 illustrates an example of an operation tree list. The analysis unit 126 generates an operation tree list 153 based on operation tree data on a plurality of operation trees, which includes the operation tree data 152. The operation tree list 153 is generated for each operation tree and includes columns for operation tree number, root node number, root instruction number, node count, and leaf count. The operation tree number is a number identifying an operation tree. The root node number is a number assigned to the root node of the operation tree. The root instruction number is an instruction number identifying an instruction corresponding to the root node. The node count indicates the number of nodes included in the operation tree. The leaf count indicates the number of leaves included in the operation tree.

Figure 21:
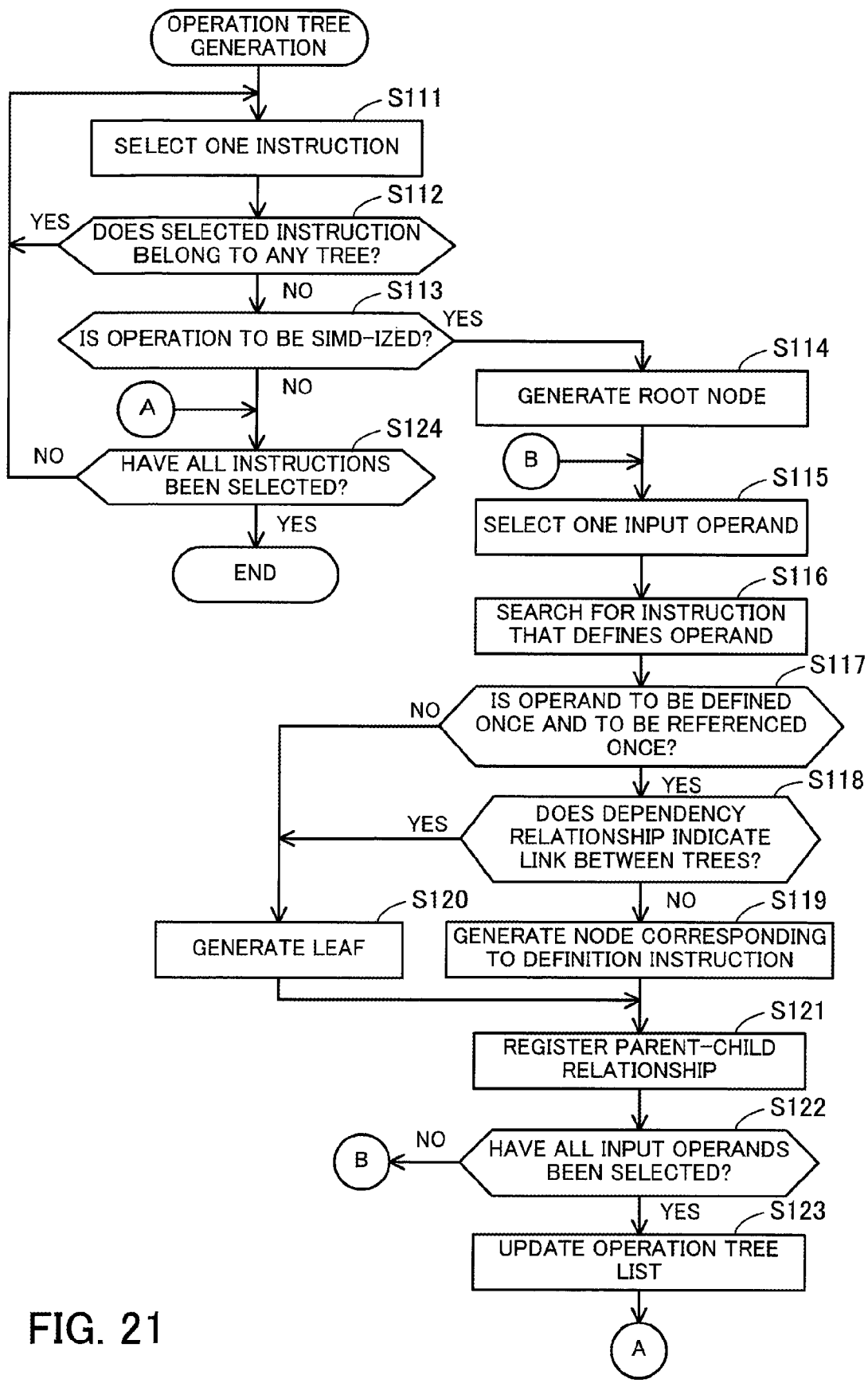
FIG. 21 is a flowchart illustrating an exemplary procedure of generating operation trees.

FIG. 21 is a flowchart illustrating an exemplary procedure of generating operation trees. The process described by this flowchart is performed at the above-described step S1.

At step S111, the analysis unit 126 selects one instruction, preferentially from the latter part of an instruction sequence within a translation block. At step S112, the analysis unit 126 determines whether the selected instruction belongs to any operation tree or not. If the instruction belongs to an operation tree, the process goes back to step S111. Otherwise, the process proceeds to step S113. At step S113, the analysis unit 126 determines whether the operation performed by the selected instruction is an operation to be SIMD-ized or not. Operations which are not to be SIMD-ized include control instructions such as a branch instruction, barrier instruction, etc. If the operation is to be SIMD-ized, the process proceeds to step S114. Otherwise, the process proceeds to step S124.

At step S114, the analysis unit 126 generates a root node corresponding to the instruction selected at step S111. The analysis unit 126 then extracts the input operands of the selected instruction. At step S115, the analysis unit 126 selects one of the input operands which have not been examined. At step S116, the analysis unit 126 searches the instruction data 151 for another instruction (a definition instruction) having, as an output operand, the same register as the selected input operand. At step S117, the analysis unit 126 determines whether or not the register that is the input operand selected at step S115 is defined only once by one instruction and is referenced only once by one instruction within the translation block. If the register meets these conditions, the process proceeds to step S118. Otherwise, the process proceeds to step S120.

At step S118, the analysis unit 126 determines whether or not a dependency relationship between the instruction (reference instruction) having the input operand selected at step S115 and the definition instruction indicates a link between a plurality of operation trees. If the dependency relationship indicates the link, the process proceeds to step S120. Otherwise, the process proceeds to step S119. At step S119, the analysis unit 126 generates a node corresponding to the definition instruction found at step S116, and then the process proceeds to step S121. The analysis unit 126 also extracts input operands from the definition instruction. At step S120, the analysis unit 126 generates a leaf corresponding to the input operand selected at step S115. At step S121, the analysis unit 126 registers a parent-child relationship between the node corresponding to the reference instruction, and the node corresponding to the definition instruction or the leaf, in the operation tree data 152.

At step S122, the analysis unit 126 determines whether all of the input operands extracted at steps S114 and S119 have been examined or not. If there is any input operand that has not been examined, the process goes back to step S115. If all of the input operands have been examined, the process proceeds to step S123. At step S123, the analysis unit 126 determines that the operation tree having the instruction selected at step S111 as the root is complete, and registers the completed operation tree in the operation tree list 153. At step S124, the analysis unit 126 determines whether all of the instructions within the translation block have been selected at step S111 or not. If all of the instructions have been selected, the process is completed. If there is any unselected instruction, then the process goes back to step S111.

The following describes a procedure of how to confirm a dependency relationship among operation trees.

Figure 22:
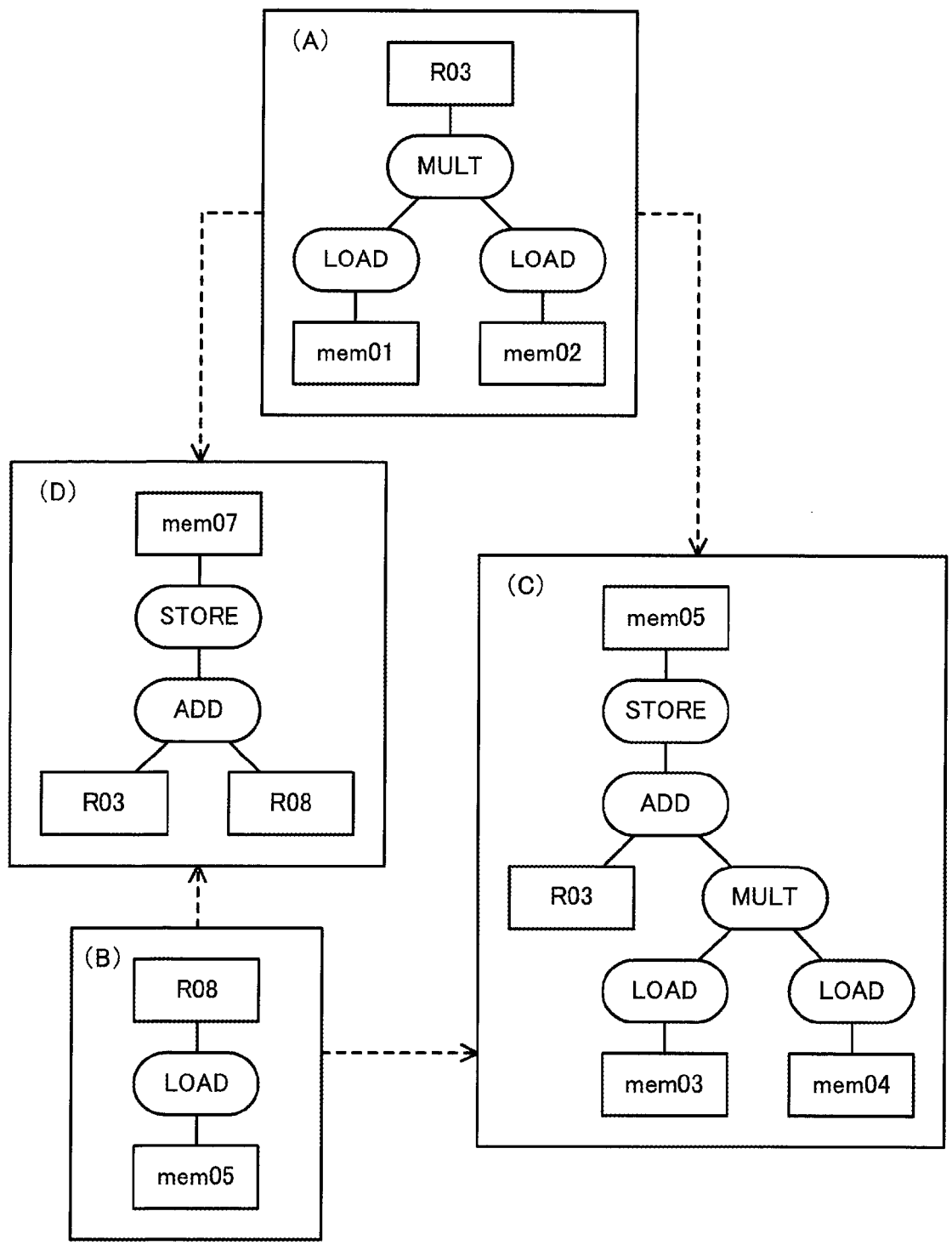
FIG. 22 illustrates an example of a dependency relationship among operation trees.

FIG. 22 illustrates an example of a dependency relationship among operation trees. Operation trees have a dependency relationship when there are constrains on the execution order of instructions belonging to one operation tree and instructions belonging to the other operation tree. This dependency relationship includes a relationship in which a register defined by an instruction belonging to one operation tree is referenced by an instruction belonging to the other operation tree. This example describes the case where operation trees A, B, C, and D are generated.

The operation tree A has leaves with input operands of mem01 and mem02, and a root node with an output operand of R03. The operation tree B has a leaf with an input operand of mem05, and a root node with an output operand of R08. The operation tree C has leaves with input operands of R03, mem03, and mem04, and a root node with an output operand of mem05. The operation tree D has leaves with input operands of R03 and R08, and a root node with an output operand of mem07. In addition, it is assumed that instructions are arranged in the order of operation trees A, B, C, and D in the intermediate code 142.

In the case where the operation trees are generated according to the above-described procedure of FIG. 21, the analysis unit 126 is able to confirm the dependency relationship by checking the output operands of the root nodes and the input operands of the leaves of the operation trees. Two operation trees are determined to have a dependency relationship when the output operands of the root nodes of the two operation trees are the same or when the input operand of a leaf of one operation tree and the output operand of the root node of the other operation tree are the same. Referring to the example of FIG. 22, the operation tree C depends on both the operation trees A and B, and the operation tree D also depends on both the operation trees A and B. The operation trees C and D have no dependency relationship, so the instructions of the operation tree C and the instructions of the operation tree D are executable in parallel. In this connection, if there is a dependency relationship among three or more operation trees, transitive rules apply. For example, when there is an operation tree E that depends on the operation tree C, this operation tree E also depends on the operation tree A.

Figure 23:
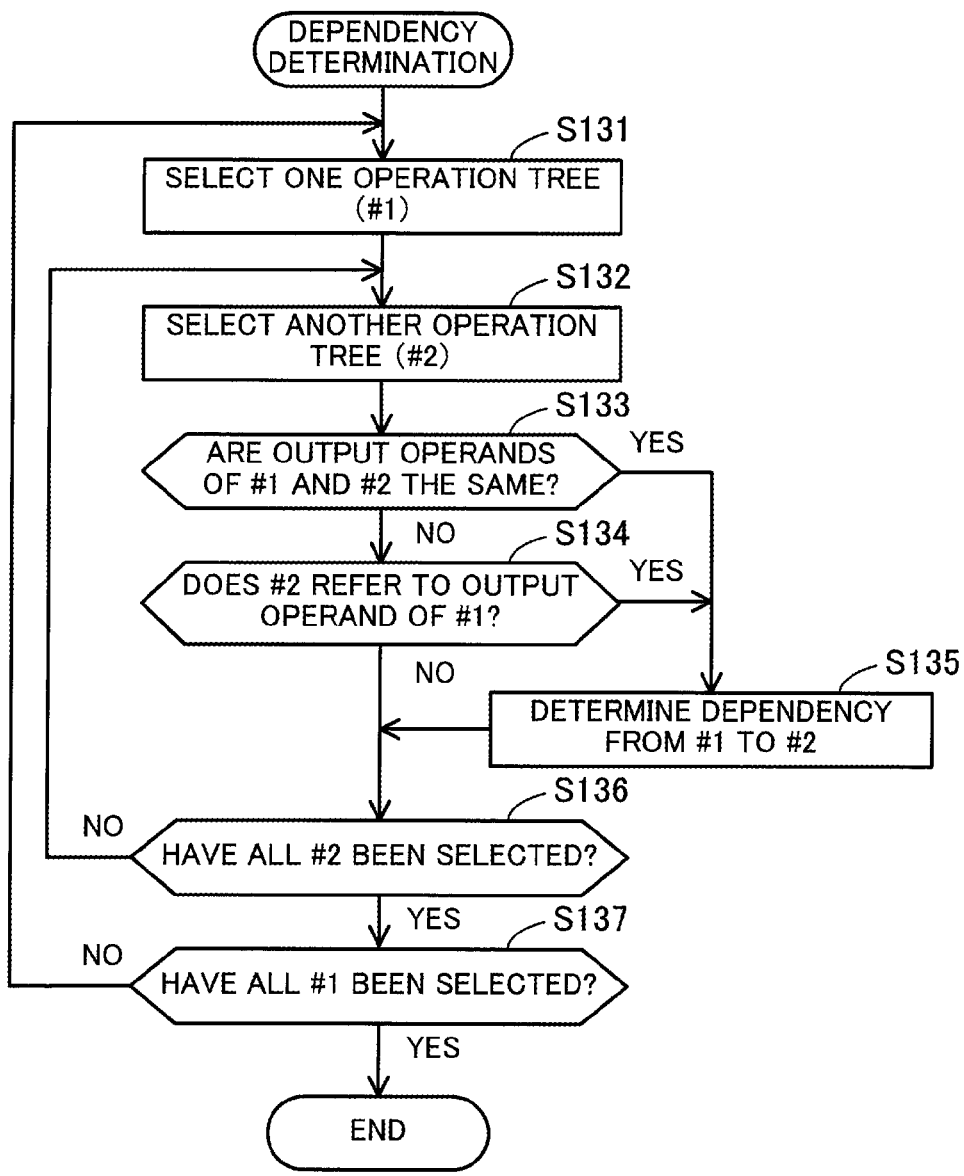
FIG. 23 is a flowchart illustrating an exemplary procedure of determining a dependency.

FIG. 23 is a flowchart illustrating an exemplary procedure of determining a dependency. The process described by this flowchart is performed at the above-described step S2.

At step S131, the analysis unit 126 selects one operation tree preferentially with a smaller operation tree number, as an operation tree #1 from a plurality of operation trees. At step S132, the analysis unit 126 selects, from the plurality of operation trees, one operation tree with a greater operation tree number than the operation tree #1, as an operation tree #2. At step S133, the analysis unit 126 determines whether the output operands of the root nodes of the operation trees #1 and #2 are the same or not. If they are the same, the process proceeds to step S135. Otherwise, the process proceeds to step S134. At step S134, the analysis unit 126 determines whether the input operands of the leaves of the operation tree #2 include the output operand of the root node of the operation tree #1 or not. If this condition is met, the process proceeds to step S135. Otherwise, the process proceeds to step S136.

At step S135, the analysis unit 126 determines that there is a dependency from the operation tree #1 to the operation tree #2 (i.e., a relationship where the operation tree #2 depends on the operation tree #1). At step S136, the analysis unit 126 determines whether all of the operation trees with greater operation tree numbers than the operation tree #1 have been selected at step S132 or not. If all of such operation trees have been selected, the process proceeds to step S137. Otherwise, the process goes back to step S132. At step S137, the analysis unit 126 determines whether all of the operation trees have been selected at step S131 or not. If all of the operation trees have been selected, the process is completed. Otherwise, the process goes back to step S131.

The following describes how to determine instruction combinations to be SIMD-ized.

Figure 24:
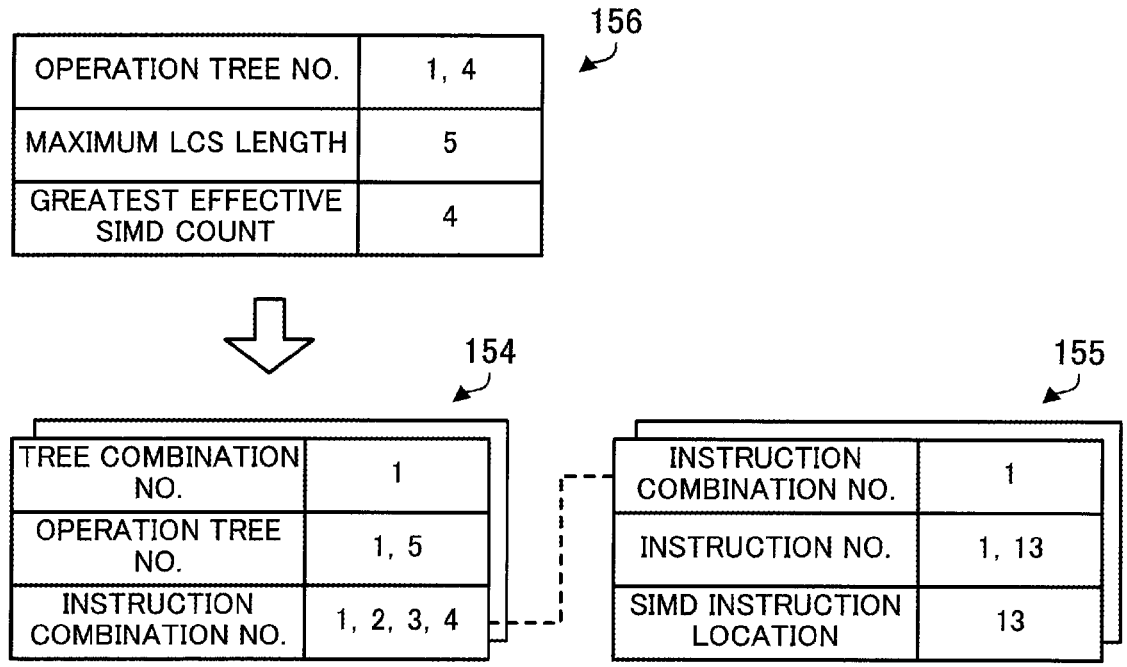
FIG. 24 illustrates an example of operation tree combination data and instruction combination data.

FIG. 24 illustrates an example of operation tree combination data and instruction combination data. When the analysis unit 126 determines instruction combinations to be SIMD-ized, the analysis unit 126 generates operation tree combination data 154 and instruction combination data 155. In addition, the analysis unit 126 generates and stores temporary storage data 156 in the RAM 102 while searching for the instruction combinations to be SIMD-ized.

The operation tree combination data 154 is generated for each combination of operation trees and includes columns for tree combination number, operation tree number, and instruction combination number. The tree combination number is a number identifying a combination of operation trees. The operation tree number column lists numbers identifying the operation trees of the combination. The number of operation tree numbers listed is the same as the value of the SIMD parallelism. The instruction combination number column lists instruction combination numbers identifying the instruction combinations regarding the combination of operation trees, out of the instruction combination numbers defined by the instruction combination data 155. The operation tree combination data 154 and the instruction combination data 155 are associated with each other by instruction combination numbers.

The instruction combination data 155 is generated for each combination of instructions and includes columns for instruction combination number, instruction number, and SIMD instruction location. The instruction combination number is a number identifying a combination of instructions. The instruction number column lists numbers identifying the instructions of the combination. The number of instruction numbers listed is the same as the value of the SIMD parallelism, i.e., the number of operation tree numbers listed in the operation tree number column of the operation tree combination data 154. The SIMD instruction location column contains information indicating where a generated SIMD instruction is inserted in the intermediate code 142.

The temporary storage data 156 includes columns for operation tree number, maximum LCS length, and greatest effective SIMD count. The operation tree number column indicates a combination of operation trees currently determined the best, out of the candidate combinations of operation trees before a best combination is determined. In the following explanation, assume that superiority or inferiority of a combination of operation trees is evaluated by using the effective number of SIMD instructions. The maximum LCS length indicates the LCS length of the combination of operation trees currently determined the best. The greatest effective SIMD count is a value (greatest value) that is obtained when the best combination pattern of instructions is selected, out of values calculated with respect to the effective number of SIMD instructions for the combination of operation trees determined the best.

Figure 25:
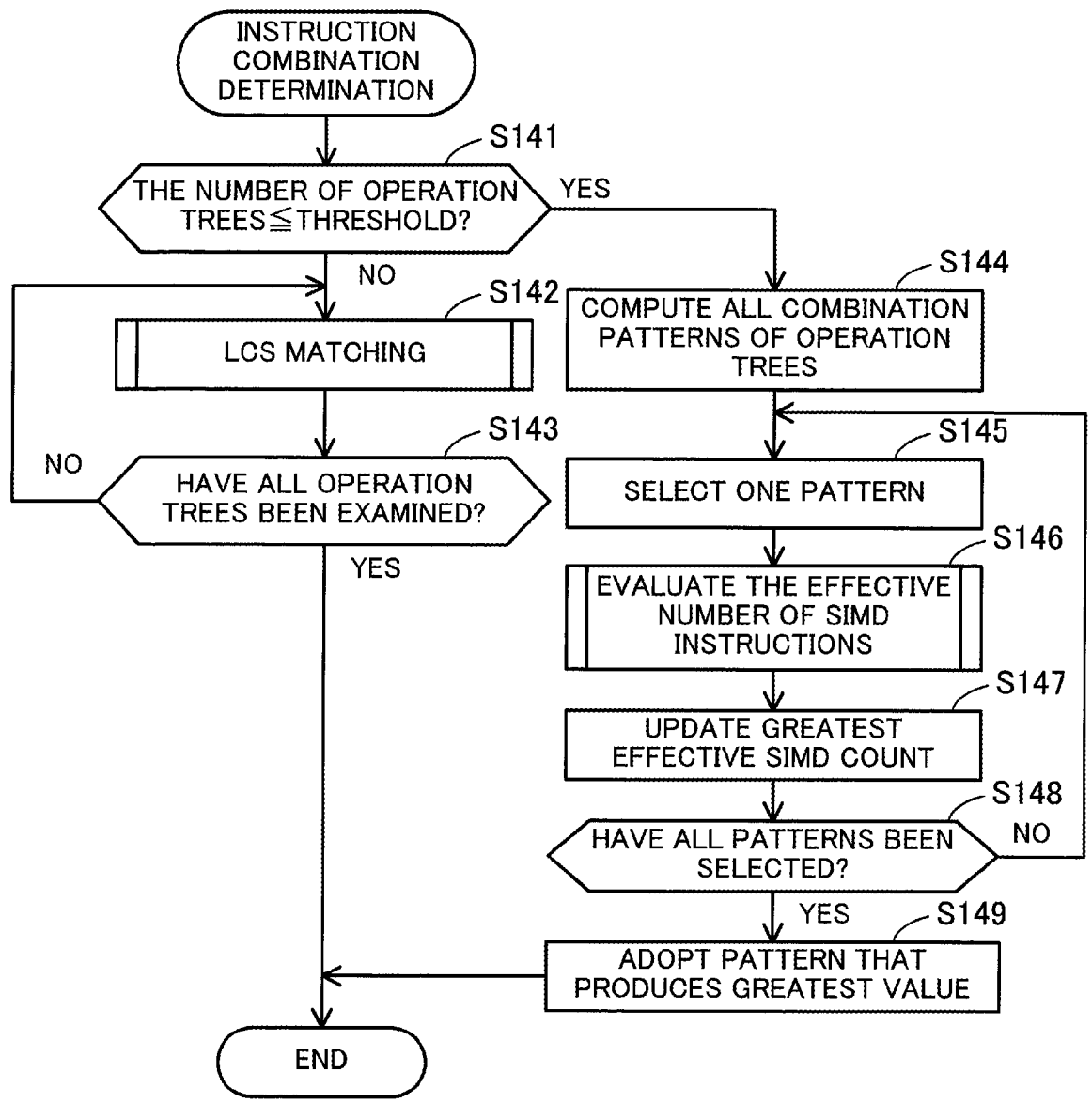
FIG. 25 is a flowchart illustrating an exemplary procedure of determining instruction combinations.

FIG. 25 is a flowchart illustrating an exemplary procedure of determining instruction combinations. The process described by this flowchart is performed at the above-described step S3.

At step S141, the analysis unit 126 determines whether or not it is possible to search all combinations obtained from generated operation trees, i.e., whether the number of operation trees is less than or equal to a threshold or not. The threshold may be changed according to the computing capability of the terminal device 100. If the number of operation trees is less than or equal to the threshold, the process proceeds to step S144. Otherwise, the process proceeds to step S142. At step S142, the analysis unit 126 computes LCSs between an operation tree preferentially with more nodes and another operation tree with a method that will be described later, and determines one combination of operation trees. At step S143, the analysis unit 126 determines whether all of the operation trees have been examined or not. If all of the operation trees have been examined, the process is completed. Otherwise, the process goes back to step S142.

At step S144, the analysis unit 126 computes all combination patterns of operation trees. For example, in the case where the SIMD parallelism is two, all patterns each combining two operation trees are computed. At step S145, the analysis unit 126 selects one of the patterns computed at step S144. At step S146, the analysis unit 126 calculates the effective number of SIMD instructions with respect to optimal combinations of instructions which are selected for the selected combination pattern of operation trees. This process is realized by using part of algorithm for an LCS matching process that will be described later.

At step S147, the analysis unit 126 updates the greatest effective SIMD count if the effective number of SIMD instructions calculated at step S146 is greater than or equal to the current greatest effective SIMD count. At step S148, the analysis unit 126 determines whether all of the combination patterns of operation trees have been selected at step S145 or not. If all of the combination patterns have been selected, the process proceeds to step S149. Otherwise, the process goes back to step S145. At step S149, the analysis unit 126 adopts the combination of operation trees which produced the greatest effective SIMD count, and the combinations of instructions in the combination of operation trees.

Figure 26:
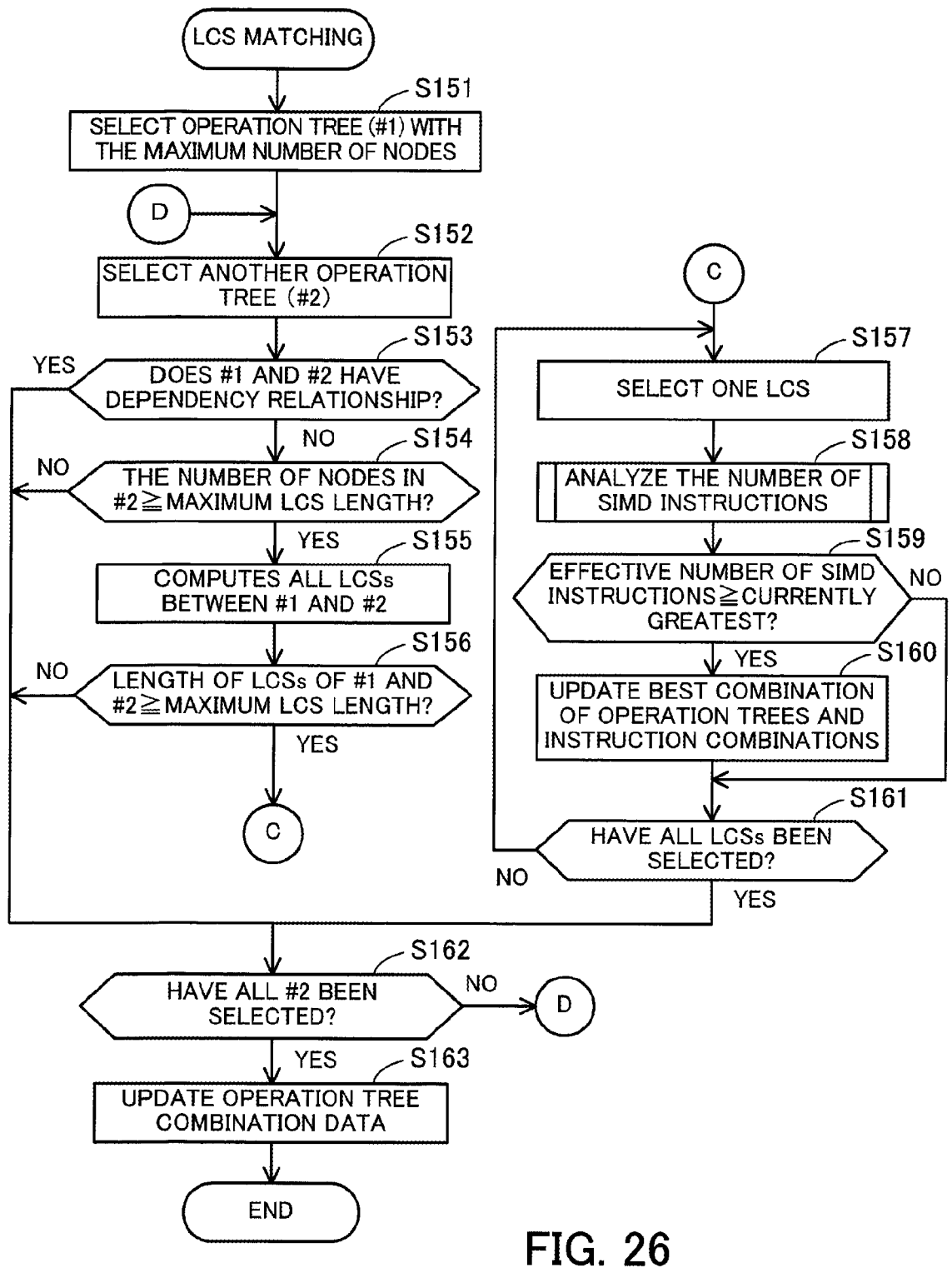
FIG. 26 is a flowchart illustrating an exemplary procedure of LCS matching.

FIG. 26 is a flowchart illustrating an exemplary procedure of LCS matching. The process described by this flowchart is performed at the above-described step S142. In addition, steps from S153 to S161 are used at the above-described step S146. In the process of FIG. 26, assume that the SIMD parallelism is two.

At step S151, the analysis unit 126 selects, as an operation tree #1, one operation tree with the greatest number of nodes from operation trees which have not been registered in the operation tree combination data 154 (from operation trees which have not been determined to be combined with another operation tree). The analysis unit 126 initializes the above-described temporary storage data 156 each time the operation tree #1 is selected. At step S152, the analysis unit 126 selects, as an operation tree #2, one operation tree preferentially with more nodes, other than the operation tree #1, from the operation trees that have not been registered in the operation tree combination data 154.

At step S153, the analysis unit 126 determines whether or not there is a dependency relationship between the operation trees #1 and #2. If there is a dependency relationship, the process proceeds to step S162. Otherwise, the process proceeds to step S154. At step S154, the analysis unit 126 determines whether or not the number of nodes in the operation tree #2 is greater than or equal to the current maximum LCS length. If the number of nodes is greater than or equal to the maximum LCS length, the process proceeds to step S155. Otherwise, the process proceeds to step S162. At step S155, the analysis unit 126 computes LCSs between the operation trees #1 and #2. At step S156, the analysis unit 126 determines whether or not the length of the computed LCSs is equal to or greater than the current maximum LCS length. If the length of the LCSs is equal to or greater than the maximum LCS length, the process proceeds to step S157. Otherwise, the process proceeds to step S162.

At step S157, the analysis unit 126 selects one of the LCSs computed at step S155. At step S158, the analysis unit 126 calculates the effective number of SIMD instructions by adopting one or more instruction combinations, with respect to the combination pattern of instructions between the operation trees #1 and #2 indicated by the selected LCS, with a method that will be described later. At step S159, the analysis unit 126 determines whether or not the effective number of SIMD instructions calculated at step S158 is equal to or greater than the current greatest effective SIMD count. If the effective number of SIMD instructions is equal to or greater than the greatest effective SIMD count, the process proceeds to step S160. Otherwise, the process proceeds to step S161.

At step S160, the analysis unit 126 registers the combination of the operation trees #1 and #2 in the temporary storage data 156, and updates the maximum LCS length and greatest effective SIMD count. In addition, the analysis unit 126 stores the combination of instructions that was adopted for calculating the effective number of SIMD instructions at step S158. At step S161, the analysis unit 126 determines whether all of the LCSs have been selected at step S157 or not. If all of the LCSs have been selected, the process proceeds to step S162. If there is any LCS that has not been selected, the process goes back to step S157. At step S162, the analysis unit 126 determines whether all operation trees that meet the conditions have been selected at step S152 or not. If all of the operation trees have been selected, the process proceeds to step S163. If there is any operation tree that has not been selected, the process goes back to step S152. At step S163, the analysis unit 126 registers the combination of operation trees, which is stored in the temporary storage data 156, and one or more best combinations of instructions in the operation tree combination data 154.

Figure 27:
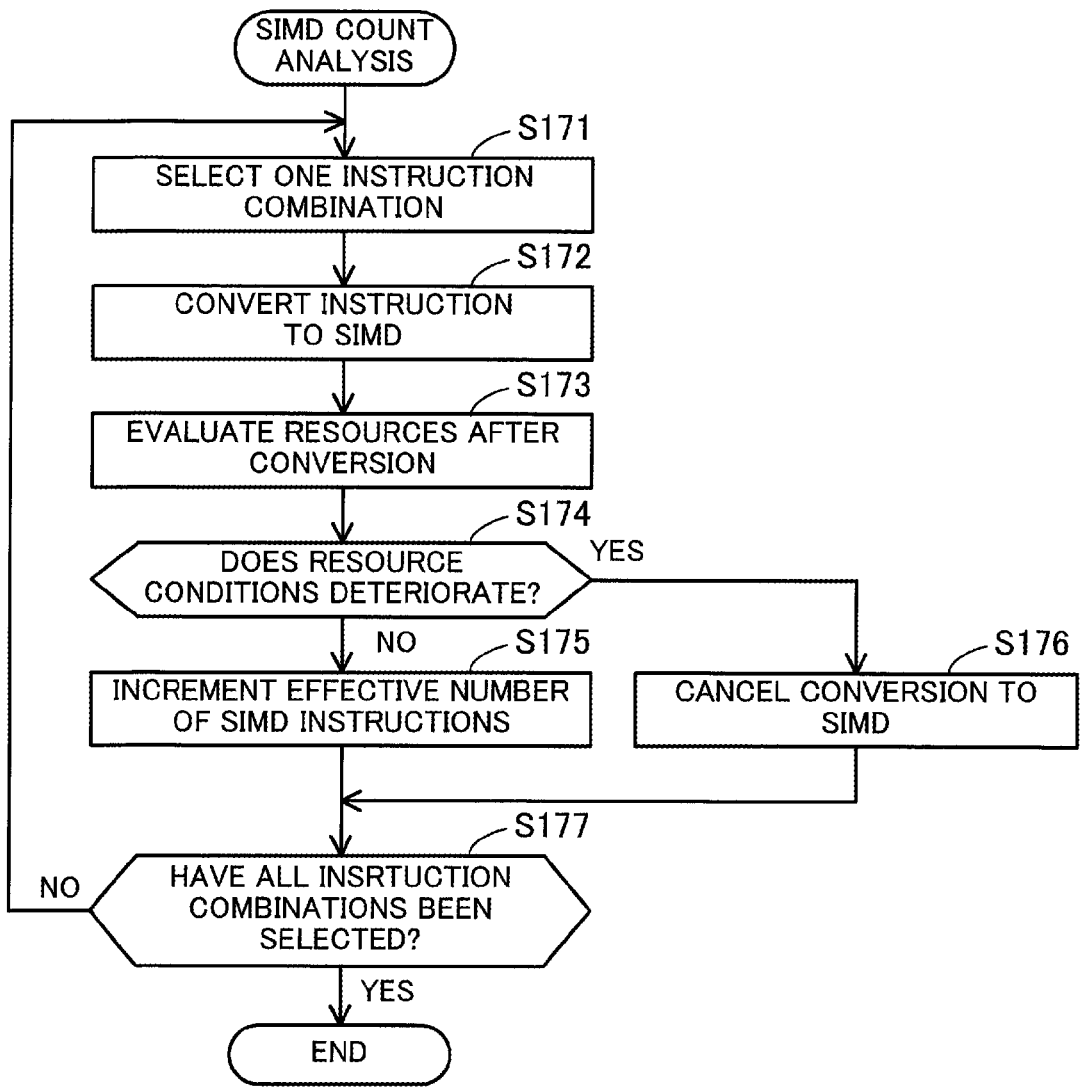
FIGS. 27 and 28 are flowcharts illustrating first and second exemplary procedures of analyzing the number of SIMD instructions.

FIG. 27 is a flowchart illustrating a first exemplary procedure of analyzing the number of SIMD instructions. The process described by this flowchart is performed at the above-described step S158.

At step S171, the analysis unit 126 selects one combination of an instruction belonging to the operation tree #1 and an instruction belonging to the operation tree #2, on the basis of an LCS. At step S172, the analysis unit 126 temporarily converts the instruction combination selected at step S171 into a SIMD instruction. At step S173, the analysis unit 126 evaluates the utilization of resources by a processor with respect to the intermediate code obtained after the conversion of step S172, and compares the utilization of resources before and after the conversion. As described earlier, for evaluating the utilization of resources, the number of SIMD registers, the total number of instructions, the number of transfer instructions, etc. may be used. To evaluate the utilization of resources, the analysis unit 126 simulates allocation of SIMD registers, for example.

At step S174, the analysis unit 126 determines whether the utilization of resources deteriorates due to the conversion of step S172 (for example, whether the total number of instructions or the number of transfer instructions increases) or not. If the utilization deteriorates, the process proceeds to step S176. Otherwise, the process proceeds to step S175. At step S175, the analysis unit 126 increments the effective number of SIMD instructions with respect to the combination pattern of instructions indicated by the LCS. At step S176, the analysis unit 126 cancels the conversion into a SIMD instruction of step S172. At step S177, the analysis unit 126 determines whether all of the instruction combinations indicated by the LCS have been selected at step S171 or not. If all of the instruction combinations have been selected, the process is completed. Otherwise, the process goes back to step S171.

As described above, the analysis unit 126 adopts one or more instruction combination so as to produce the greatest effective number of SIMD instructions, for each of the combination patterns of instructions indicated by an LCS. In this connection, in the case where the SIMD parallelism is two and the number of transfer instructions is evaluated as the utilization of resources, the above step S173 may be simplified.

Figure 28:
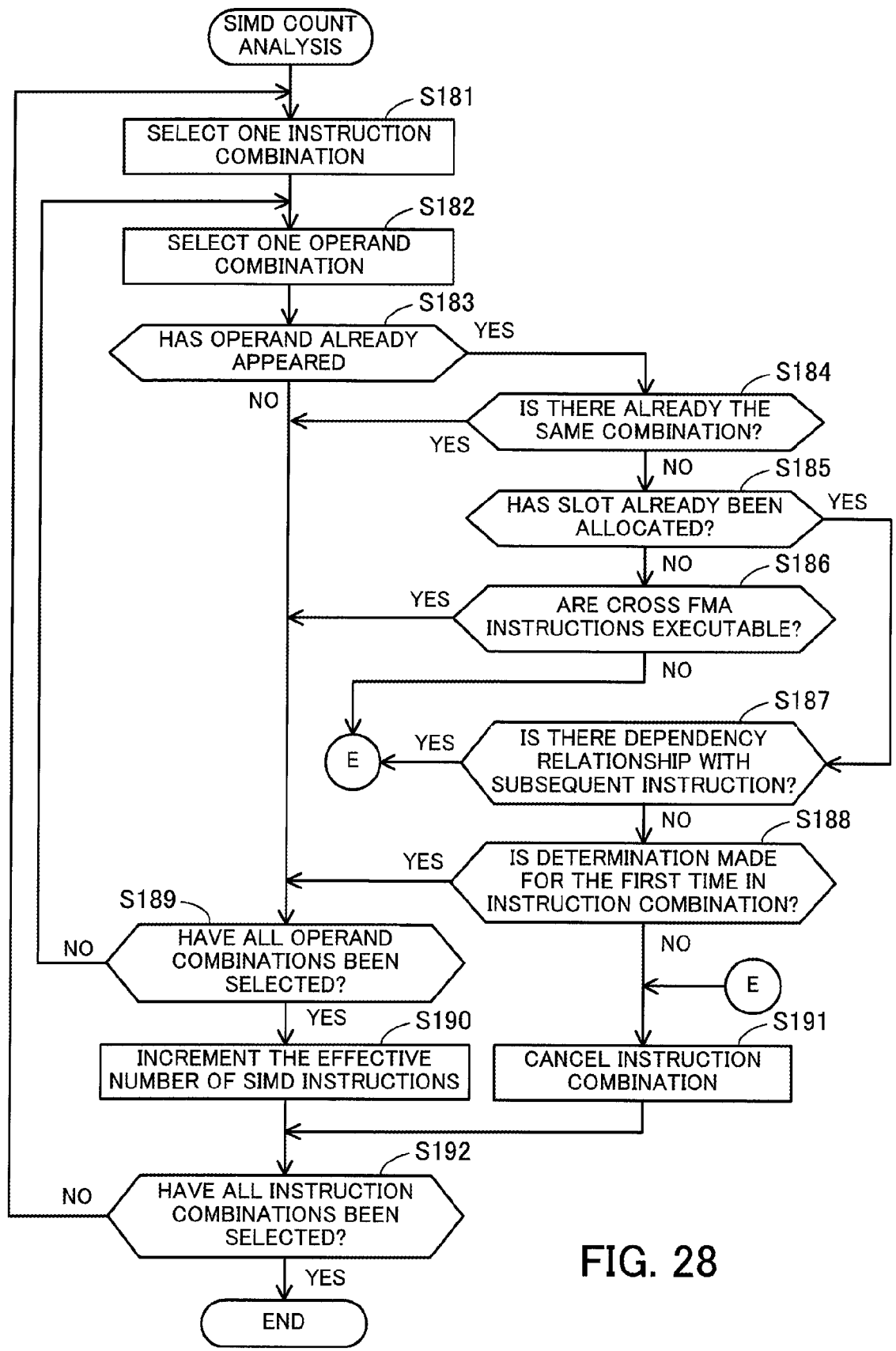

FIG. 28 is a flowchart illustrating a second exemplary procedure of analyzing the number of SIMD instructions. The process described by this flowchart is performed instead of the process of FIG. 27.

At step S181, the analysis unit 126 selects one combination of an instruction belonging to the operation tree #1 and an instruction belonging to the operation tree #2, on the basis of an LCS. At step S182, the analysis unit 126 selects one combination of an operand included in one instruction of the instruction combination and an operand included in the other instruction. The selected operands include both an input operand and an output operand. At step S183, the analysis unit 126 determines whether or not at least one of the two operands selected at step S182 appears in an instruction combination already determined to be adopted. If the operand has already appeared, the process proceeds to step S184. Otherwise, the process proceeds to step S189.

At step S184, the analysis unit 126 determines whether or not the combination of operands selected at step S182 is the same as a combination of operands which has already appeared. If there is the same operand combination, the process proceeds to step S189. Otherwise, the process proceeds to step S185. At step S185, the analysis unit 126 determines whether or not a slot to be allocated to the selected operands is the same as a slot already allocated. If the slot has already been allocated, the process proceeds to step S187. Otherwise, the process proceeds to step S186.

At step S186, the analysis unit 126 determines whether or not cross FMA instructions are executable in the generated object code (whether or not the generated object code is object code for a processor which supports cross FMA instructions). In the case where cross FMA instructions are executable, the process proceeds to step S189. Otherwise, the process proceeds to step S191. At step S187, the analysis unit 126 determines whether the selected operand is referenced by a subsequent instruction or not, i.e., whether the selected operand has a dependency relationship with the subsequent instruction or not. If there is a dependency relationship, the process proceeds to step S191. Otherwise, the process proceeds to step S188. At step S188, the analysis unit 126 determines whether or not the determination of step S187 is made for the first time with respect to the selected instruction combination. If it is the first time, the process proceeds to step S189. Otherwise, the process proceeds to step S191.

At step S189, the analysis unit 126 determines whether all combinations of operands have been selected at step S182 or not. If all of the combinations of operands have been selected, the process proceeds to step S190. If there is any combination that has not been selected, the process goes back to step S182. At step S190, the analysis unit 126 increments the effective number of SIMD instructions with respect to the combination pattern of instructions indicated by the LCS, and then the process proceeds to step S192. At step S191, the analysis unit 126 cancels the instruction combination selected at step S181. At step S192, the analysis unit 126 determines whether all instruction combinations have been selected at step S181 or not. If all of the combinations have been selected, the process is completed. Otherwise, the process goes back to step S181.

The terminal device 100 according to the second embodiment converts each of a plurality of operation trees to an operation sequence, and computes LCSs, thereby making it possible to specify combination patterns of instructions between the operation trees so as to produce the greatest number of instruction combinations. At this time, the operation trees may not be in the same shape, or two instructions to be combined may not exist at the same level of the operation trees. In addition, an LCS and instruction combinations to be adopted are selected so as to provide the most advantageous utilization of resources. This enables the compiler 120 to efficiently perform an optimization process.

As described earlier, the information processing of the first embodiment is realized by causing the information processing apparatus 10 to execute an intended program. The information processing of the second embodiment is realized by causing the terminal device 100 to execute an intended program. The program may be recorded on a computer-readable recording medium (for example, recording medium 23). Recording media include magnetic disks, optical discs, magneto-optical discs, semiconductor memories, etc. The magnetic disks include FDs and HDDs. The optical discs include CDs, CD-R (Recordable)/RW (Rewritable), DVDs, and DVD-R/RW.

To distribute a program, portable recording media, on which the program is recorded, may be provided. Alternatively, the program may be stored in the storage device of another computer and may be transferred from the computer through a network. A computer stores in its local storage device (for example, HDD 103) the program recorded on a portable recording medium or transferred from the other computer, for example, and then executes the program. The computer may run the program directly from the portable recording medium. Also, while receiving the program being transferred from the other computer through the network, the computer may sequentially run this program.

According to one aspect, it is possible to efficiently search for a combination of instructions for generating an instruction for performing the same type of operation on different data in parallel.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-readable, non-transitory storage medium storing a computer program for generating, from a first code, a specific instruction for performing a same type of operation on different data in parallel by combining two or more instructions included in the first code, and generating a second code including the specific instruction, the computer program causing a computer to perform a procedure comprising:

generating first and second operation trees representing a dependency relationship among instructions included in the first code, computing a first operation sequence by arranging operations specified by instructions of the first operation tree in an order that matches a structure of the first operation tree, and computing a second operation sequence by arranging operations specified by instructions of the second operation tree in an order that matches a structure of the second operation tree;

computing one or more longest operation subsequences of operation subsequences common to the first and second operation sequences; and evaluating, for each of two or more longest operation subsequences, when computed, utilization of computing resources used for executing combinations of instructions of the first and second operation trees corresponding to operations included in said each longest operation subsequence, and selecting a combination pattern of instructions indicated by one of the two or more longest operation subsequences based on results of the evaluating.

2. The computer-readable, non-transitory storage medium according to claim 1, wherein the evaluating of the utilization of the computing resources includes evaluating a number of transfer instructions which are generated by inserting specific instructions, each for performing a same type of operation on different data in parallel, in the second code, and which are instructions for transferring data to be referenced by the specific instructions between registers.

3. The computer-readable, non-transitory storage medium according to claim 2, wherein the evaluating of the utilization of the computing resources includes computing an index value based on a reduced number of instructions that is caused by converting instructions included in the first code into the specific instructions, each for performing a same type of operation on different data in parallel, and an increased number of instructions that is caused by generating the transfer instructions.

4. The computer-readable, non-transitory storage medium according to claim 2, wherein the evaluating of the utilization of the computing resources includes determining whether or not a processor that executes the second code supports cross operation instructions for performing operations on data with treating the data as if the data were virtually transferred between the registers without the transfer instructions generated, and evaluating the number of transfer instructions generated, depending on a result of the determining.

5. The computer-readable, non-transitory storage medium according to claim 1, wherein the operation subsequences common to the first and second operation sequences appear by deleting one or more operations from one or both of the first and second operation sequences.

6. A code generation method, executed by a computer, for generating, from a first code, a specific instruction for performing a same type of operation on different data in parallel by combining two or more instructions included in the first code, and generating a second code including the specific instruction, the code generation comprising:
generating first and second operation trees representing a dependency relationship among instructions included in the first code, computing a first operation sequence by arranging operations specified by instructions of the first operation tree in an order that matches a structure of the first operation tree, and computing a second operation sequence by arranging operations specified by instructions of the second operation tree in an order that matches a structure of the second operation tree;
computing one or more longest operation subsequences of operation subsequences common to the first and second operation sequences, which appear by deleting one or more operations from one or both of the first and second operation sequences; and
evaluating, for each of two or more longest operation subsequences, when computed, utilization of computing resources used for executing combinations of instructions of the first and second operation trees corresponding to operations included in said each longest operation subsequence, and selecting a combination pattern of instructions indicated by one of the two or more longest operation subsequences based on results of the evaluating.

7. An information processing apparatus comprising:
a storage unit configured to store a first code, and a second code including a specific instruction for performing a same type of operation on different data in parallel; and
a processor configured to generate the second code from the first code by combining two or more instructions included in the first code,
wherein the processor generates first and second operation trees representing a dependency relationship among instructions included in the first code, computes a first operation sequence by arranging operations specified by instructions of the first operation tree in an order that matches a structure of the first operation tree, and computes a second operation sequence by arranging operations specified by instructions of the second operation tree in an order that matches a structure of the second operation tree,
computes one or more longest operation subsequences of operation subsequences common to the first and second operation sequences, which appear by deleting one or more operations from one or both of the first and second operation sequences, and
evaluates, for each of two or more longest operation subsequences, when computed, utilization of computing resources used for executing combinations of instructions of the first and second operation trees corresponding to operations included in said each longest operation subsequence, and selects a combination pattern of instructions indicated by one of the two or more longest operation subsequences based on results of the evaluating.

* * * * *